(12) United States Patent
Fukutomi

(10) Patent No.: US 10,975,800 B2
(45) Date of Patent: Apr. 13, 2021

(54) CYLINDER BLOCK ASSEMBLY

(71) Applicant: TOYOTA JIDOSHA KABUSHIKI KAISHA, Toyota (JP)

(72) Inventor: Ippei Fukutomi, Machida (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/550,384

(22) Filed: Aug. 26, 2019

(65) Prior Publication Data
US 2020/0072160 A1    Mar. 5, 2020

(30) Foreign Application Priority Data

Sep. 4, 2018  (JP) ............................ JP2018-165292
May 30, 2019  (JP) ............................ JP2019-101794

(51) Int. Cl.
*F02F 7/00*       (2006.01)
*F02F 1/10*       (2006.01)
*F16C 9/02*       (2006.01)
*F02B 75/20*      (2006.01)

(52) U.S. Cl.
CPC ............ *F02F 7/0007* (2013.01); *F02B 75/20* (2013.01); *F02F 7/0021* (2013.01); *F16C 9/02* (2013.01); *F02F 2200/00* (2013.01)

(58) Field of Classification Search
CPC ........ F02F 7/0053; F02F 7/0007; F02F 1/102; F16C 9/02; F16C 2360/22; F02B 75/20
See application file for complete search history.

(56) References Cited

U.S. PATENT DOCUMENTS

| | | | | |
|---|---|---|---|---|
| 4,451,186 A * | 5/1984 | Payne | ...................... | B23B 41/12 33/605 |
| 4,569,109 A * | 2/1986 | Fetouh | ................. | B23D 31/003 29/413 |
| 4,643,145 A * | 2/1987 | Bolton | ................... | F02F 7/0053 123/195 R |
| 4,684,267 A * | 8/1987 | Fetouh | ................. | B23D 31/003 384/294 |
| 4,926,810 A * | 5/1990 | Diehl | .................... | F02F 7/0007 123/192.1 |
| 7,322,750 B1 * | 1/2008 | Besselman | ............ | F02F 7/0053 123/195 R |

(Continued)

FOREIGN PATENT DOCUMENTS

| | | |
|---|---|---|
| JP | 10-47335 A | 2/1998 |
| JP | 10-246151 A | 9/1998 |
| JP | 2012-225236 A | 11/2012 |

*Primary Examiner* — Long T Tran
(74) *Attorney, Agent, or Firm* — Oblon, McClelland, Maier & Neustadt, L.L.P.

(57) ABSTRACT

A cylinder block assembly includes a cylinder block having cylinders and a plurality of crank caps fixed to the cylinder block. The crank caps are arranged such that one of the crank caps is disposed on each of both sides of each of the cylinders in the alignment direction and among the plurality of crank caps arranged in line, each of a center crank cap located at a center position and two side crank caps respectively located at both ends has a hole or a groove in such a manner as to be more easily deformable than intermediate crank caps each of which is located between the center crank cap and one of the side crank caps when a load is received from the crankshaft.

14 Claims, 20 Drawing Sheets

(56) References Cited

U.S. PATENT DOCUMENTS

| | | | |
|---|---|---|---|
| 2007/0209628 A1* | 9/2007 | Natkin | F02F 7/0053 123/195 R |
| 2011/0013862 A1* | 1/2011 | Nakamure | F02F 7/0053 384/457 |
| 2012/0279036 A1* | 11/2012 | Dickerson | B25B 27/0035 29/426.5 |
| 2013/0170774 A1* | 7/2013 | Mochida | F16C 9/02 384/91 |

* cited by examiner

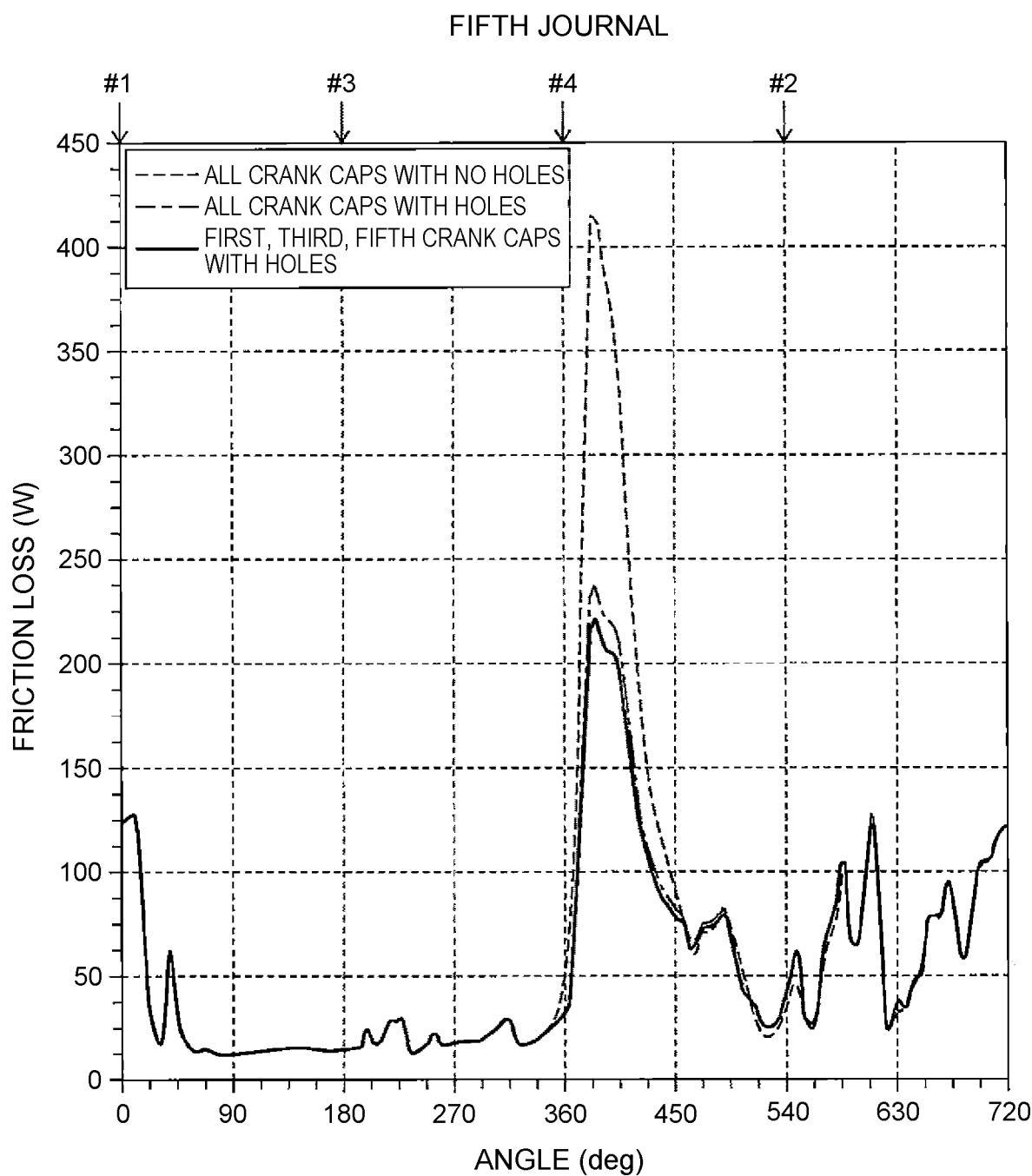

CYLINDER BLOCK ASSEMBLY

INCORPORATION BY REFERENCE

The disclosure of Japanese Patent Application No. 2019-101794 filed on May 30, 2019 including the specification, drawings and abstract is incorporated herein by reference in its entirety.

BACKGROUND

1. Technical Field

The present disclosure relates to a cylinder block assembly.

2. Description of Related Art

Generally, an internal combustion engine has a cylinder block assembly that includes a cylinder block and a plurality of crank caps fixed to the cylinder block. The respective crank caps and the cylinder block are provided with crank bearings for supporting crank journals of a crankshaft (e.g., Japanese Patent Application Publication No. 2012-225236 (JP 2012-225236 A)).

SUMMARY

Meanwhile, during running of an internal combustion engine, when an explosion occurs in each cylinder of the internal combustion engine, a large load is applied to the crankshaft, and accordingly, a large load is also applied to the crank bearing from the crank journal.

In addition, when a large load is applied to the crankshaft, the crankshaft is deformed due to this load, and some of the crank journals come into a state of tilting relative to the crank bearings. Consequently, in some of the crank journals, a load applied from the crank journals to the crank bearings locally increases, so that a friction is caused between the crank journals and the crank bearings, which causes increase in friction loss due to the friction.

On the other hand, based on the studies of the inventors of the present application, it is found that machining is performed to provide a hole or a groove to each crank cap such that the crank cap can be easily deformed when a load is applied from the crankshaft, whereby a friction loss can be reduced. However, such machining on the crank caps causes increase in manufacturing cost and manufacturing time for the cylinder block assembly.

The present disclosure provides a cylinder block assembly in which a friction loss between each crank journal and each crank bearing is reduced while increase in manufacturing cost and manufacturing time is reduced, and also provides a manufacturing method for the above cylinder block assembly while increase in manufacturing cost and manufacturing time is reduced.

The present disclosure is as follows.

A cylinder block assembly according to a first aspect of the present disclosure includes: a cylinder block having an even number of four or more cylinders arranged in line; and a plurality of crank caps fixed to the cylinder block and aligned in line in an alignment direction of the cylinders. The crank caps and the cylinder block are provided with crank bearings, and the crank bearings support a crankshaft such that the crankshaft is rotatable. In the above cylinder block assembly, the crank caps are arranged such that one of the crank caps is disposed on each of both sides of each of the cylinders in the alignment direction, and among the plurality of crank caps arranged in line, each of a center crank cap located at a center position and two side crank caps respectively located at both ends has a hole or a groove in such a manner as to be more easily deformable than intermediate crank caps each of which is located between the center crank cap and one of the side crank caps when a load is received from the crankshaft.

In the above aspect, each of the center crank cap and the side crank caps may have the hole, and the hole may extend through the crank cap.

In the above aspect, a plurality of the holes may be provided in each of the center crank cap and the side crank caps.

In the above aspect, the plurality of the holes provided in each of the center crank cap and the side crank caps may be arranged in a direction perpendicular to the alignment direction of the cylinders and a mounting direction in which the crank caps are mounted to the cylinder block.

In the above aspect, the plurality of the holes provided in each of the center crank cap and the side crank caps may have the same shape.

In the above aspect, the holes may be provided so as to extend in the alignment direction of the cylinders.

In the above aspect, each of the center crank cap and the side crank caps may have the groove, and the groove is provided on a side surface of each of the center crank cap and the side crank caps, the side surface being located in the alignment direction of the cylinders.

The grooves may be respectively provided on both side surfaces of each of the center crank cap and the side crank caps to have a symmetrical shape, the side surfaces being located in the alignment direction of the cylinders.

In the above aspect, at least a part of the hole or the groove may be disposed so as to overlap a corresponding one of the crank bearings when viewed in the mounting direction in which the crank caps (20) are mounted to the cylinder block.

In the above aspect, the hole or the groove of the center crank cap and the hole or the groove of each of the side crank caps may be provided such that the side crank caps are more easily deformable than the center crank cap is when a load is received from the crankshaft.

In the above aspect, the center crank cap and the two side crank caps may have the same shape.

In the above aspect, the intermediate crank caps may have the same shape.

A manufacturing method for a cylinder block assembly according to a second aspect of the present disclosure is a manufacturing method for a cylinder block assembly that includes a cylinder block having an even number of four or more cylinders arranged in line, and a plurality of crank caps fixed to the cylinder block and arranged in line in an alignment direction of the cylinders so as to support a crankshaft such that the crankshaft is rotatable. The manufacturing method includes: manufacturing a plurality of crank caps having the same shape; performing a removal process on some crank caps of the manufactured crank caps so as to remove a part of each of the crank caps such that the crank caps become easily deformable when a load is received from the crankshaft; assembling the crank caps that have been subjected to the removal process to a center crank journal located at a center and two side crank journals located at both ends among a plurality of crank journals of the crankshaft; and assembling the crank caps that have not been subjected to the removal process to intermediate crank journals each of which is located between the center crank journal and one of the side crank journals among the plurality of crank journals.

In the above aspect, the removal process may include a process of forming holes extending through the crank caps or a process of forming grooves on side surfaces of the crank caps, the side surfaces being located in the alignment direction of the cylinders.

According to the present disclosure, provided is a cylinder block assembly in which a frictional resistance between the crank journals and the crank bearings is reduced while increase in manufacturing cost and manufacturing time is reduced, and provided is a manufacturing method for manufacturing the above cylinder block assembly while increase in manufacturing cost and manufacturing time is reduced.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 13 is a view showing a transition of a friction loss generated between a fifth journal and a crank bearing of a fifth crank cap;

DETAILED DESCRIPTION OF EMBODIMENTS

Figure 1:
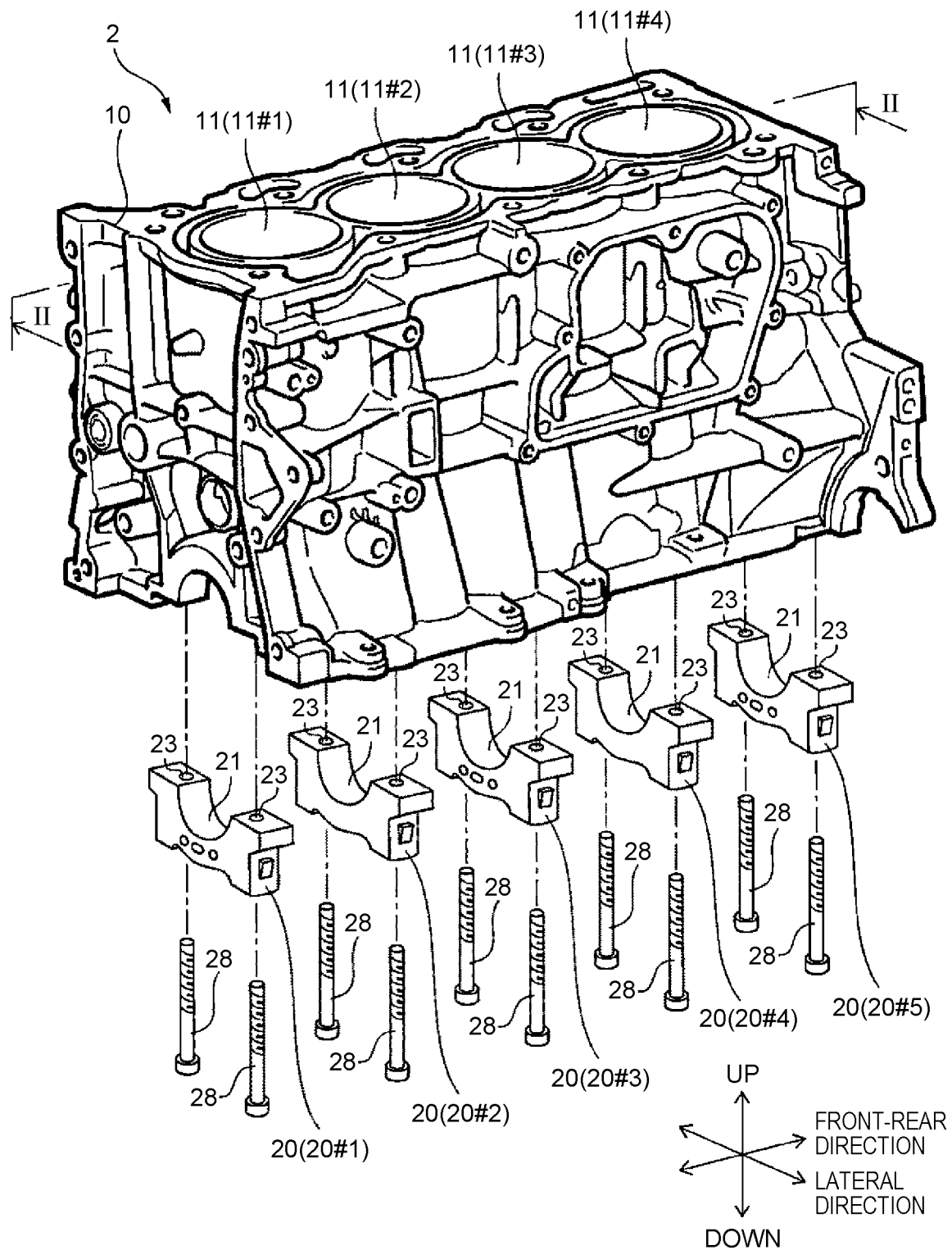
FIG. 1 is an exploded perspective view of a cylinder block assembly according to one embodiment.

Hereinafter, embodiments will be described in detail with reference to the drawings. In the following description, similar components will be denoted by the same reference numerals.

Figure 2:
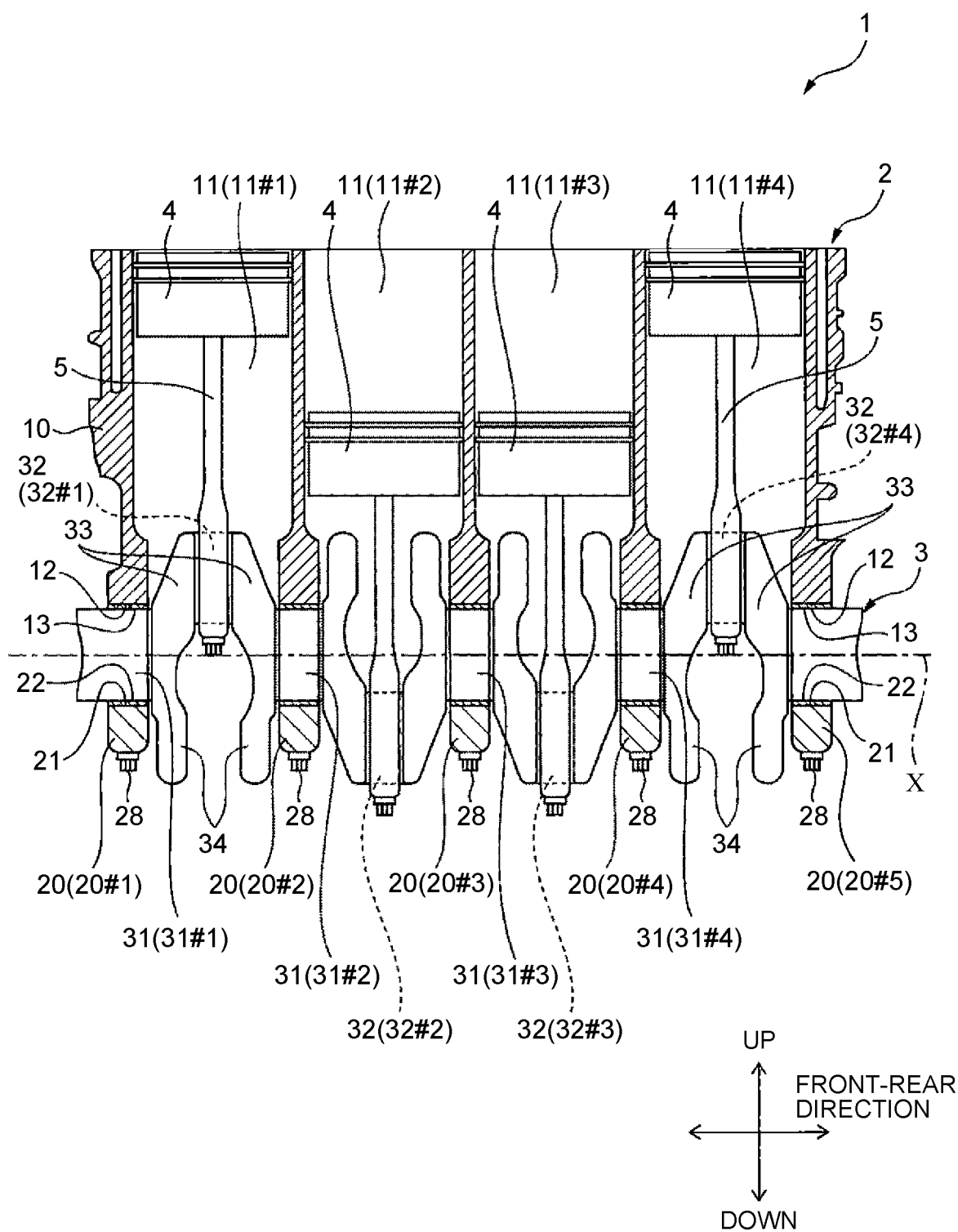
FIG. 2 is a schematic sectional view showing a part of an internal combustion engine provided with a cylinder block assembly according to one embodiment.

The configuration of an internal combustion engine provided with a cylinder block assembly according to the present embodiment will be described with reference to FIG. 1 and FIG. 2. FIG. 1 is an exploded perspective view of the cylinder block assembly according to the present embodiment. FIG. 2 is a schematic sectional view showing a part of an internal combustion engine 1 provided with the cylinder block assembly according to the present embodiment. In particular, FIG. 2 shows a sectional view of the internal combustion engine 1 when the cylinder block assembly is seen along a plane II-II of FIG. 1.

For convenience of explanation, in the present specification, an axial direction of a crankshaft, that is, an alignment direction of cylinders will be referred to as a "front-rear direction". Further, a mounting direction of crank caps to the cylinder block (also corresponding to an axial direction of the cylinder in the present embodiment) is referred to as a "height direction". In particular, in the "height direction", a side where the cylinder block is located relative to the crank caps is referred to as an upper side, and a side where the crank caps are located relative to the cylinder block is referred to as a lower side. In addition, a direction perpendicular to the "front-rear direction" and the "height direction" is referred to as a "lateral direction". The "front-rear direction", the "height direction", and the "lateral direction" do not necessarily specify an installation direction of the cylinder block assembly. Therefore, depending on the installation mode of the cylinder block assembly, the "height direction" may denote a horizontal direction in some cases, for example.

The internal combustion engine according to the present embodiment is an in-line four-cylinder internal combustion engine. As shown in FIG. 2, the internal combustion engine 1 includes a cylinder block assembly 2, a crankshaft 3, pistons 4 and connecting rods 5. As shown in FIG. 1 and FIG. 2, the cylinder block assembly 2 includes a cylinder block 10, a plurality of crank caps (hereinafter, also simply referred to as "caps") 20, and a plurality of cap bolts 28 used for fixing the caps 20 to the cylinder block 10.

The cylinder block 10 of the cylinder block assembly 2 includes a plurality of cylinders 11. In the present embodiment, the cylinder block 10 is provided with four cylinders 11. The cylinders 11 are arranged in line in the axial direction of the crankshaft 3 and provided in the cylinder block 10 such that the axes of the cylinders 11 are parallel to one another. In the present specification, the four cylinders 11 aligned in line are referred to, in order from one end to the other end, as a first cylinder 11 #1, a second cylinder 11 #2, a third cylinder 11 #3, and a fourth cylinder 11 #4 respectively.

A lower surface of the cylinder block 10 is provided with a plurality of semicircular recesses 12, and a crank bearing 13 is provided in each recess 12. The crank bearings 13 support the crankshaft 3, such that the crankshaft is rotatable.

The recesses 12 and the crank bearings 13 are arranged in line in the axial direction of the crankshaft 3. Further, when viewed in the height direction, one recess 12 and one crank bearing 13 are provided on each side of each cylinder 11 in the axial direction of the crankshaft 3. Therefore, in the present embodiment, the cylinder block 10 is provided with five recesses 12 and five crank bearings 13. On both sides of the crank bearing 13 of the cylinder block 10 in the lateral direction, bolt holes (not shown) for accepting the cap bolts 28 are provided.

Each cap 20 has a semicircular recess 21 provided on a top thereof, and a crank bearing 22 is provided in the recess 21. The crank bearing 22 supports the crankshaft 3, such that the crankshaft 3 is rotatable. Each cap 20 is arranged such that the crank bearing 22 thereof faces one of the crank bearings 13 provided in the cylinder block 10. Therefore, in the present embodiment, the cylinder block assembly 2 includes five caps 20 arranged in line in the alignment direction of the cylinders 11. The caps 20 are arranged such that one of the caps 20 is disposed on each of both sides of each of the cylinders 11 in the axial direction of the crankshaft 3 (alignment direction of the cylinders 11) when viewed in the height direction.

In the present specification, the five caps 20 arranged in line are respectively referred to as a first cap 20 #1, a second cap 0 #2, a third cap 20 #3, a fourth cap 20 #4, and a fifth cap 20 #5 in order from the end on the first cylinder 11 #1 side to the end on the fourth cylinder 11 #4 side. Therefore, as shown in FIG. 2, the first cap 20 #1 and the second cap 20 #2 are arranged on both sides of the first cylinder 11 #1.

In addition, in the present specification, of the five caps 20 arranged in line, a cap located at a center position (i.e., the third cap 20 #3) is also referred to as a center cap. Also, among the five caps 20 arranged in line, the caps 20 located at both ends (that is, the first cap 20 #1 and the fifth cap 20 #5) are also referred to as side caps. Furthermore, the caps 20 located between the center cap and the side caps (i.e., the second cap 20 #2 and the fourth cap 20 #4) are also referred to as intermediate caps.

Each cap 20 has two through holes 23 into which cap bolts 28 are inserted. The through holes 23 extend in the height direction, and the through holes 23 are provided on both sides of each recess 21 (crank bearing 22) in the lateral direction.

The cap bolts 28 are used to fix the cap 20 to the cylinder block 10. The cap bolt 28 is screwed into a bolt hole of the cylinder block 10 through the through hole 23 of the cap 20.

The crankshaft 3 is supported by the cylinder block assembly 2 such that the crankshaft is rotatable. The crankshaft 3 also includes crank journals (hereinafter, simply referred to as "journals") 31, crank pins 32, crank arms 33, and counter weights 34. In the present embodiment, a flywheel 35 (see FIG. 5A to FIG. 8B) is provided at an end of the crankshaft 3 on the fourth cylinder 11 #4 side of the crankshaft 3, and a pulley 36 (see FIG. 5A to FIG. 8B) for driving auxiliary equipment of the internal combustion engine 1 is provided at an end on the first cylinder 11 #1 side of the crankshaft 3.

The journals 31 are located on a rotational axis X of the crankshaft 3 in such a manner as to extend in a direction along the rotational axis X. The journal 31 is supported by a crank bearing 13 provided in the cylinder block 10 such that the journal 31 is rotatable. Further, the journal 31 is supported by the crank bearing 22 provided in the cap 20 such that the journal 31 is rotatable. Thus, in the present embodiment, the crankshaft 3 includes five journals 31.

In present specification, the five journals 31 arranged in line are referred to respectively as a first journal 31 #1, a second journal 31 #2, a third journal 31 #3, a fourth journal 31 #4, and a fifth journal 31 #5 in order from an end on the first cylinder 11 #1 side to an end on the fourth cylinder 11 #4 side. Therefore, as shown in FIG. 2, the first journal 31 is supported by the crank bearing 22 of the first cap 20 #1.

In addition, in the present specification, among the five journals 31 arranged in line, the journal located at a center position (i.e., the third journal 31 #3) is also referred to as a center journal. In addition, among the five journals 31 arranged in line, the journals 31 located at both ends (i.e., the first journal 31 #1 and the fifth journal 31 #5) are also referred to as side journals. Furthermore, the journals 31 located between the center journal and the side journals (i.e., the second journal 31 #2 and the fourth journal 31 #4) are also referred to as intermediate journals.

The crank pins 32 are arranged so as to extend eccentrically from a rotational axis X of the crankshaft 3 and to extend in parallel with this rotational axis X. Each crank pin 32 is disposed between every pair of adjacent journals 31. In the present embodiment, some of the adjacent crank pins 32 are arranged to be eccentric by 180° from the rotational axis X relative to each other. The crank pin 32 is supported by the connecting rod 5 such that the crank pin 32 is rotatable.

In the present specification, a crank pin connected to the piston 4 in the first cylinder 11 #1 via the connecting rod 5 is referred to as a first crank pin 32 #1, and a crank pin connected to the piston 4 in the second cylinder 11 #2 via the connecting rod 5 is referred to as a second crank pin 32 #2. Similarly, a crank pin connected to the piston 4 in the third cylinder 11 #3 via the connecting rod 5 is referred to as a third crank pin 32 #3, and a crank pin connected to the piston 4 in the fourth cylinder 11 #4 via the connecting rod 5 is referred to as a fourth crank pin 32 #4.

The crank arm 33 couples the corresponding journal 31 and the corresponding crank pin 32 that are adjacent to each other. The counter weight 34 is arranged to extend from the corresponding journal 31 in a direction opposite to a direction in which the corresponding crank arm 33 extends.

The pistons 4 are disposed in the respective cylinders 11 so as to be slidable in the axial direction of the respective cylinders. The piston 4 is connected to the crankshaft 3 via a piston pin (not shown), and reciprocates up and down in the cylinder 11 along with the rotation of the crankshaft 3.

The connecting rod 5 is connected at its one end to the corresponding piston 4 via the piston pin and at its other end to the corresponding crank pin 32 of the crankshaft 3. The connecting rod 5 acts to convert a reciprocating motion of the piston 4 into a rotational motion of the crankshaft 3.

Figure 3A:
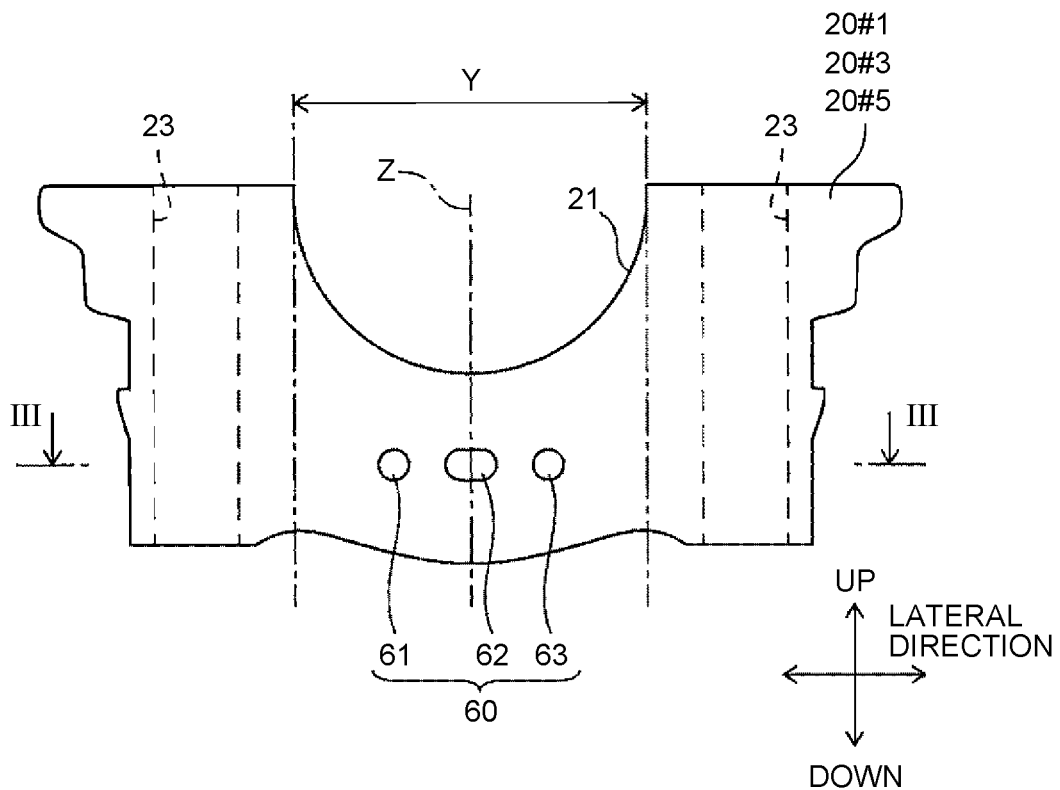
FIG. 3A is a view showing a configuration of a center crank cap and a side crank cap.
Figure 3B:
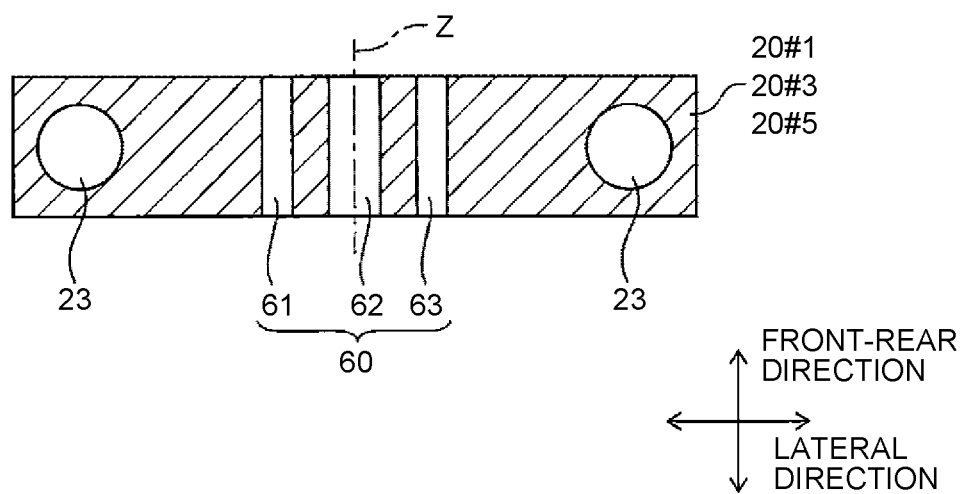
FIG. 3B is a view showing the configuration of the center crank cap and the side crank cap.

Next, a configuration of the crank cap 20 will be specifically described with reference to FIG. 3A, FIG. 3B, FIG. 4A, and FIG. 4B. FIG. 3A, FIG. 3B are views showing a configuration of the center cap (i.e., the third cap 20 #3) and the side cap (i.e., the first cap 20 #1 and the fifth cap 20 #5). FIG. 3A is a side view of the center cap and the side cap, and FIG. 3B is a sectional plan view taken along line of FIG. 3A.

In the present embodiment, the center cap (20 #3) and the plurality of side caps (20 #1, 20 #5) have the same shape. As shown in FIG. 3A, each of the center cap and the side caps has a plurality of holes 60 below the recess 21, that is, below the crank bearing 22 (opposite to the mounting direction of the cap 20 to the cylinder block 10). In the present embodiment, each of the center cap (20 #3) and the side caps (20 #1, 20 #5) has three holes of a first hole 61, a second hole 62 and a third hole 63.

As shown in FIG. 3B, these three holes 60 each extend in the front-rear direction (the alignment direction of the cylinders 11) in the center cap (20 #3) and the side caps (20 #1, 20 #5) and in parallel to one another to extend through these caps. Also, as shown in FIG. 3A and FIG. 3B, these three holes 60 are arranged side by side in the lateral direction. In the present embodiment, as shown in FIG. 3B, these three holes 60 are arranged on the same plane in a cross section perpendicular to the height direction. In addition, in the present embodiment, these three holes 60 are all disposed inward of both lateral ends of the recess 21 (that is, the both lateral ends of the crank bearing 22) when viewed in the height direction (i.e., located within a region Y in FIG. 3A). In other words, these three holes 60 provided in the crank cap are disposed so as to overlap the recess 21 of the crank cap (that is, the crank bearing 22) when viewed in the height direction.

The first hole 61 and the third hole 63 located on both lateral sides have the same circular cross-sectional shape in the cross section perpendicular to the front-rear direction. In the cross section perpendicular to the front-rear direction, the second hole 62 located at a center position in the lateral direction has a substantially oval (or elliptical) cross-sectional shape in which its major axis extends in the lateral direction and its minor axis extends in the height direction. These holes 60 are provided to be symmetrical with respect to a central plane Z in the lateral direction of the cap.

Figure 4A:
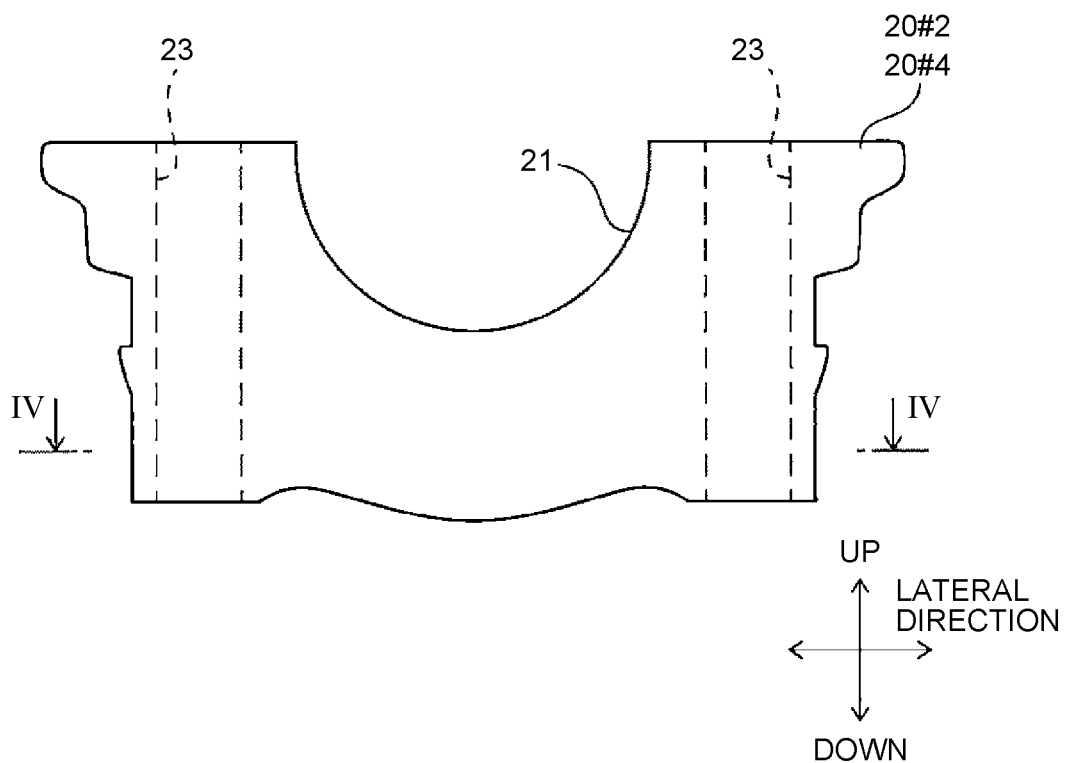
FIG. 4A is a view showing a configuration of an intermediate crank cap.
Figure 4B:
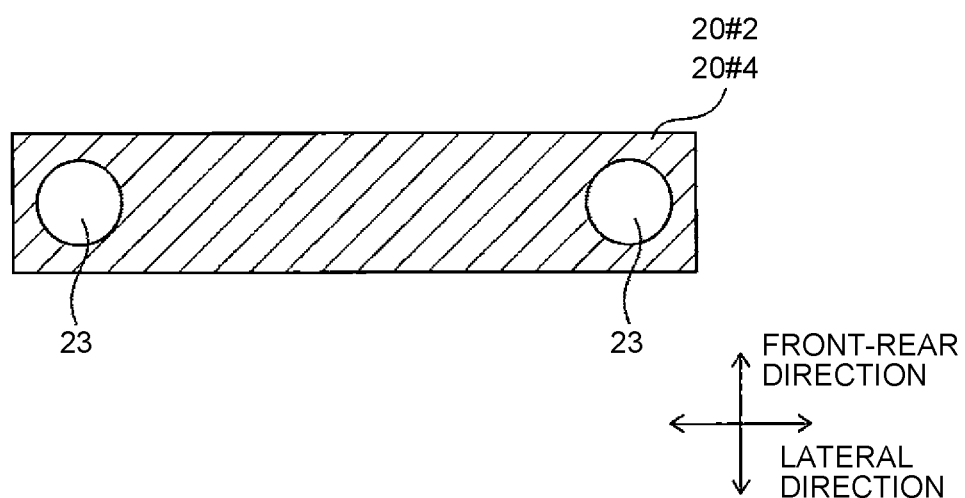
FIG. 4B is a view showing the configuration of the intermediate crank cap.

FIG. 4A, FIG. 4B are views showing a configuration of each intermediate cap (that is, the second cap 20 #2 and the fourth cap 20 #4). FIG. 4A is a side view of each intermediate cap and FIG. 4B is a sectional view taken along line IV-IV of FIG. 4A. In the present embodiment, the plurality of intermediate caps (20 #2, 20 #4) have the same shape. As shown in FIG. 4A, FIG. 4B, in the present embodiment, each intermediate cap is not provided with holes which are provided in the center cap (20 #3) and the side caps (20 #1, 20 #5). However, the intermediate cap is configured in the same manner as that in the center cap and the side caps except that the holes are not provided.

In the present embodiment, as the holes 60 are provided in the caps 20 as described above, the center cap (20 #3) and the side caps (20 #1, 20 #5) can be more easily deformed than the intermediate caps (20 #2, 20 #4) when a load is received from the crankshaft 3. In other words, in the present embodiment, the center cap (20 #3) and the side caps (20 #1, 20 #5) each have the holes 60 so as to be more easily deformable than the intermediate caps (20 #2, 20 #4) when a load is received from the crankshaft 3.

Figure 5A:
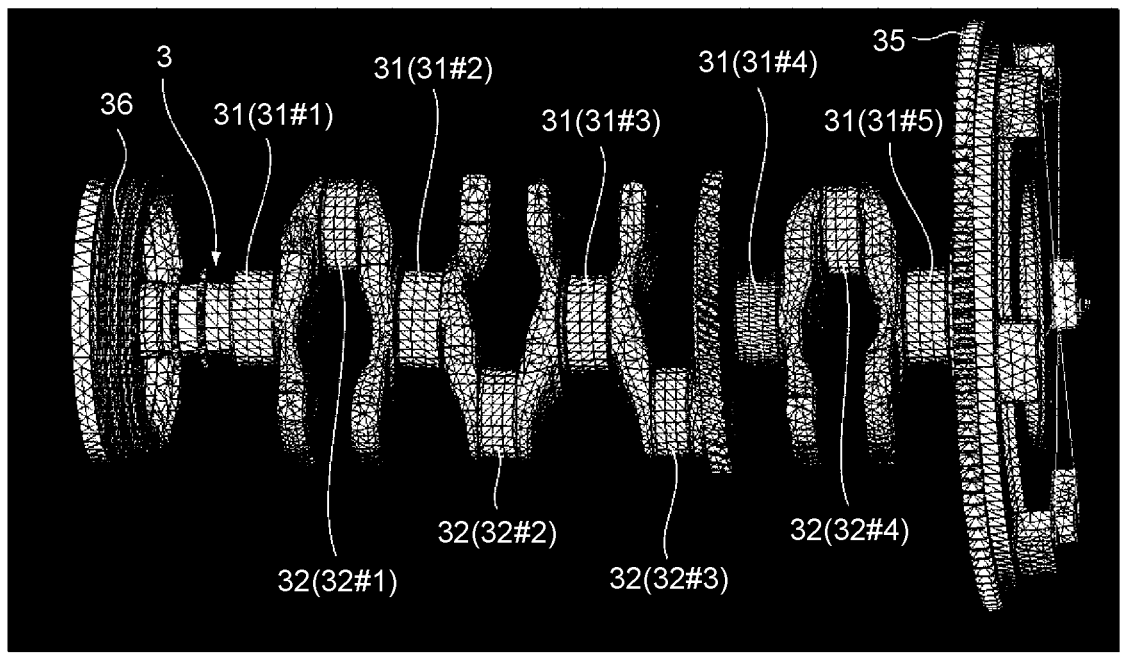
FIG. 5A is a view schematically showing a deformation mode of the crankshaft when an explosion occurs in a first cylinder.
Figure 5B:
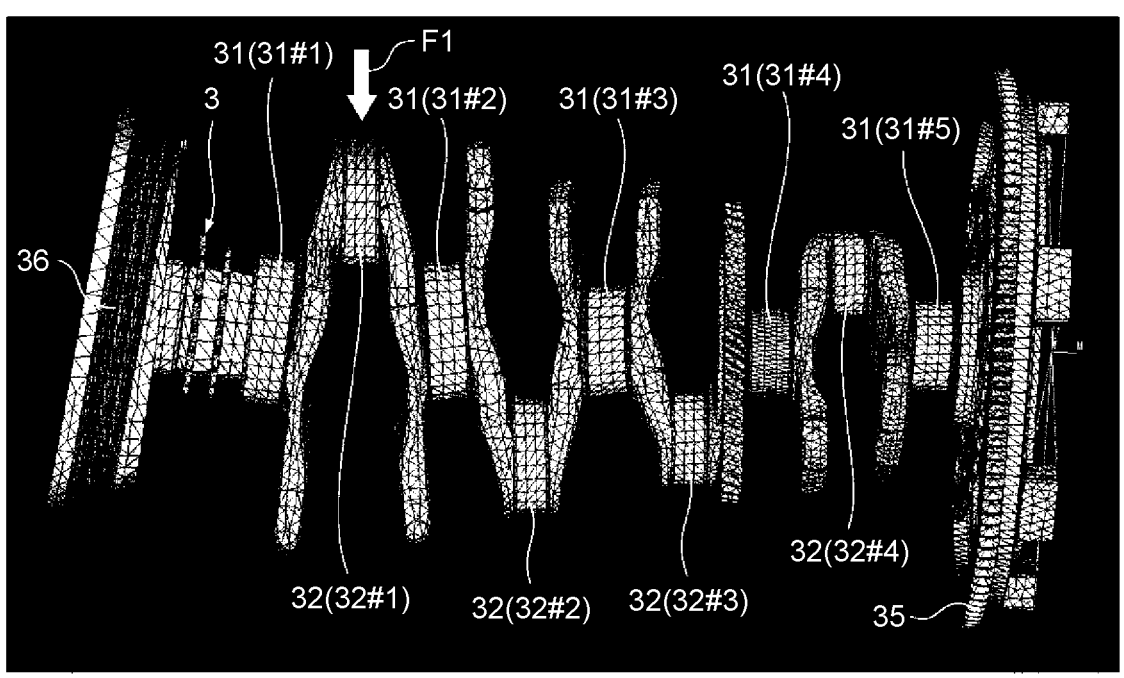
FIG. 5B is a view schematically showing the deformation mode of the crankshaft when an explosion occurs in the first cylinder.
Figure 6A:
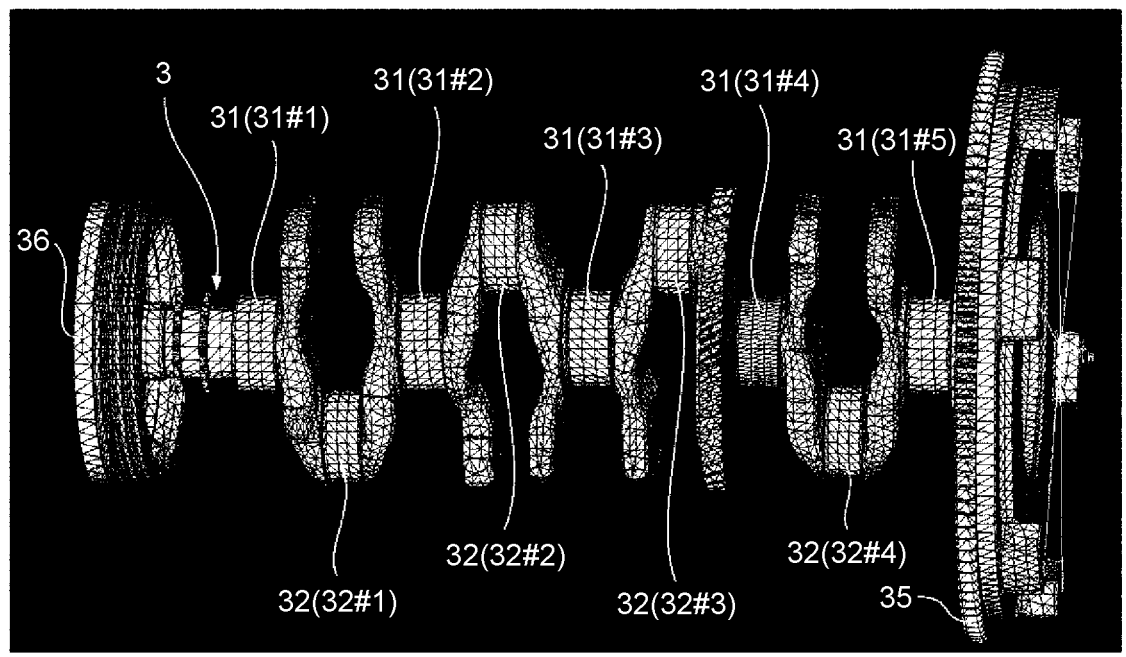
FIG. 6A is a view schematically showing a deformation mode of the crankshaft when an explosion occurs in a third cylinder.
Figure 6B:
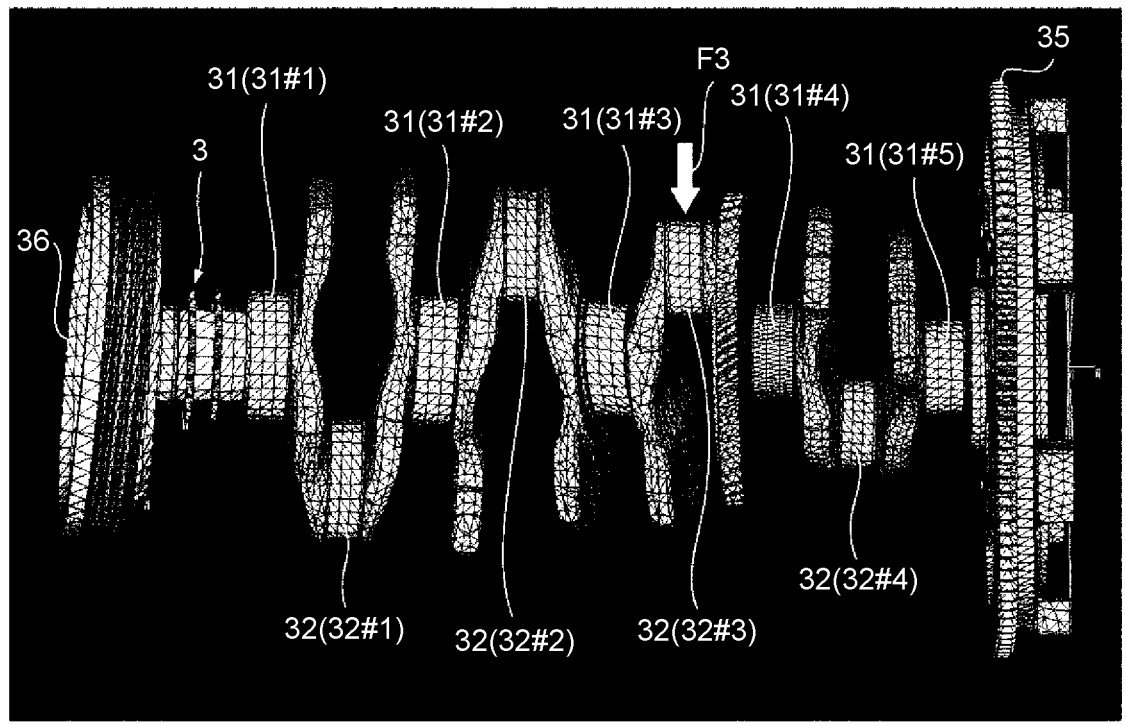
FIG. 6B is a view schematically showing the deformation mode of the crankshaft when an explosion occurs in the third cylinder.
Figure 7A:
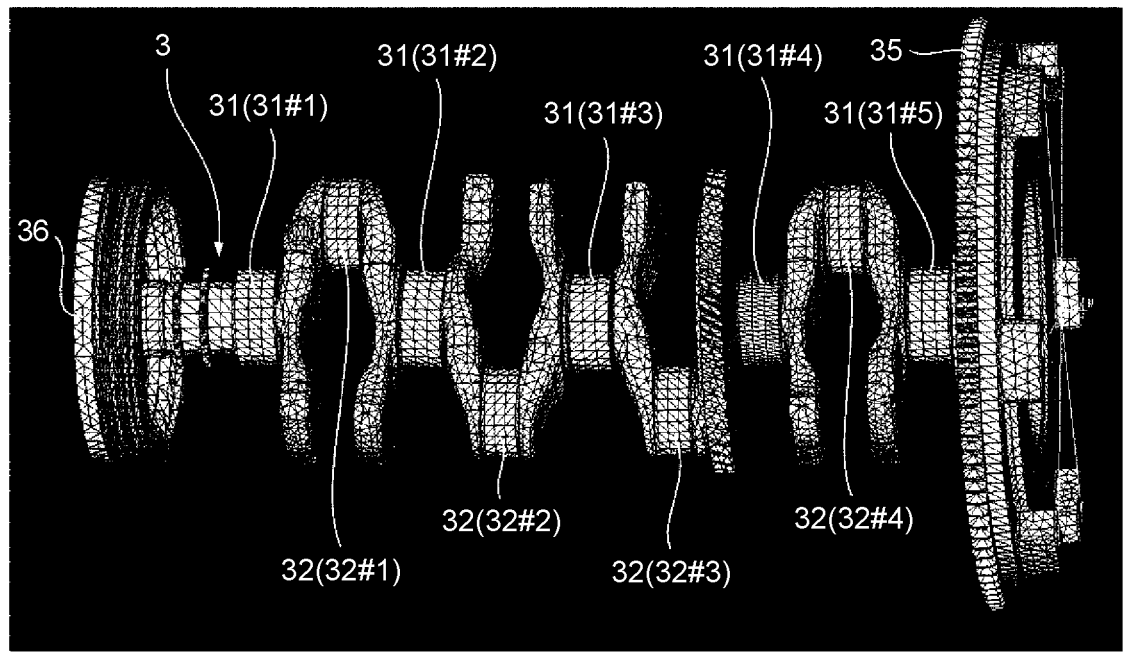
FIG. 7A is a view schematically showing a deformation mode of the crankshaft when an explosion occurs in a fourth cylinder.
Figure 7B:
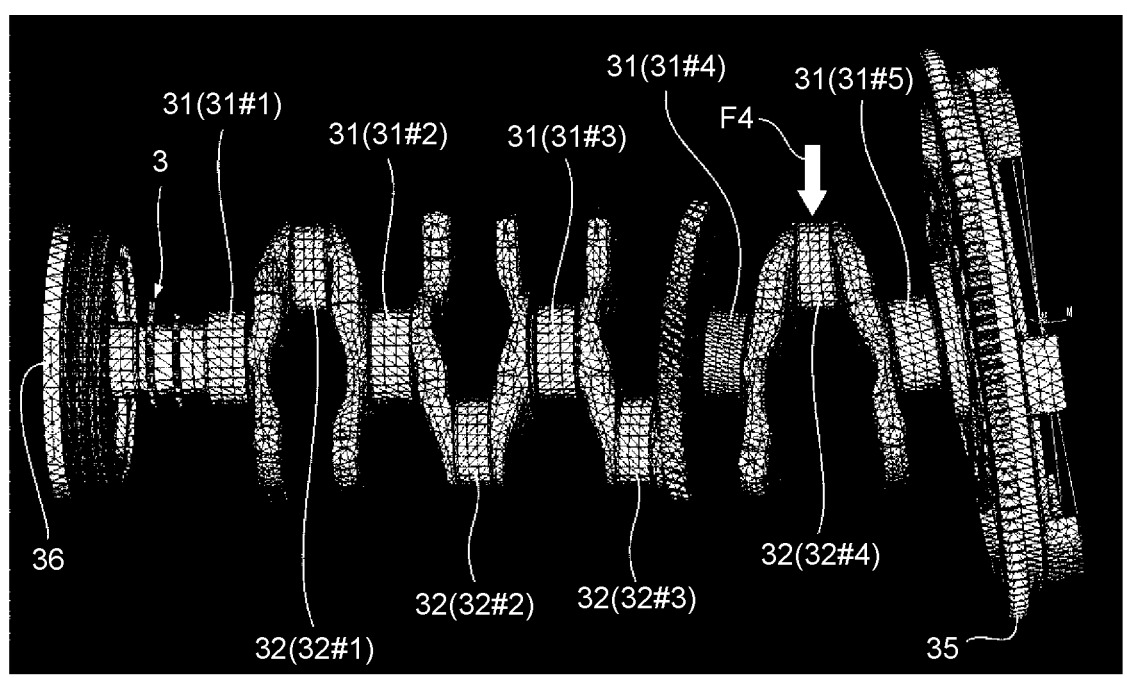
FIG. 7B is a vie schematically showing the deformation mode of the crankshaft when an explosion occurs in the fourth cylinder.
Figure 8A:
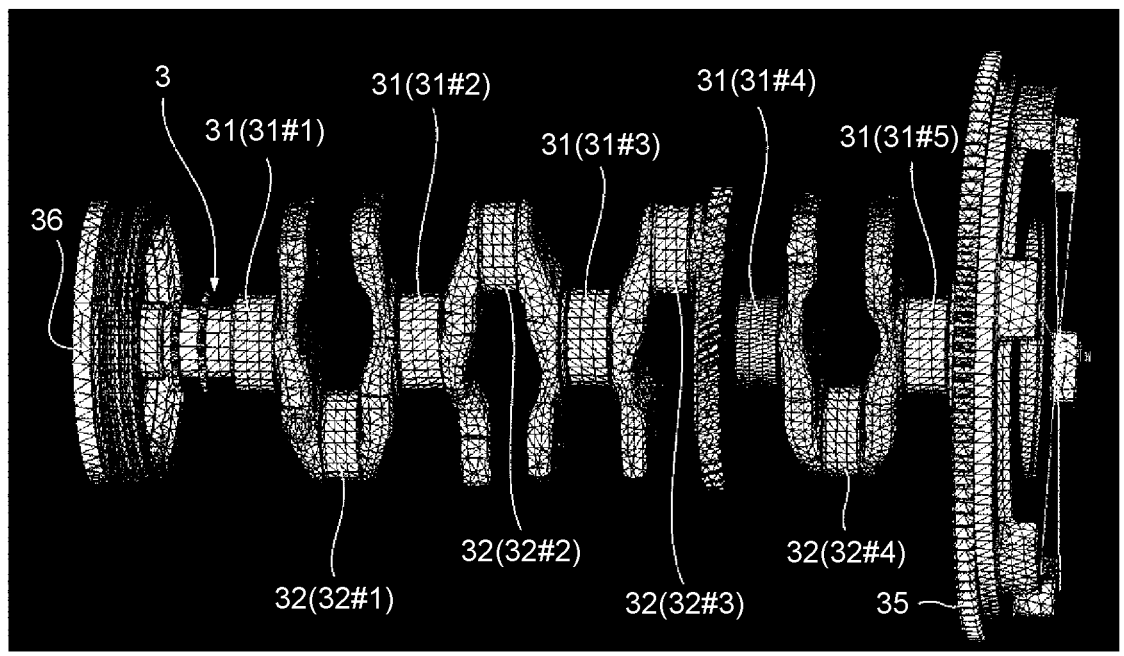
FIG. 8A is a view schematically showing a deformation mode of the crankshaft when an explosion occurs in a second cylinder.
Figure 8B:
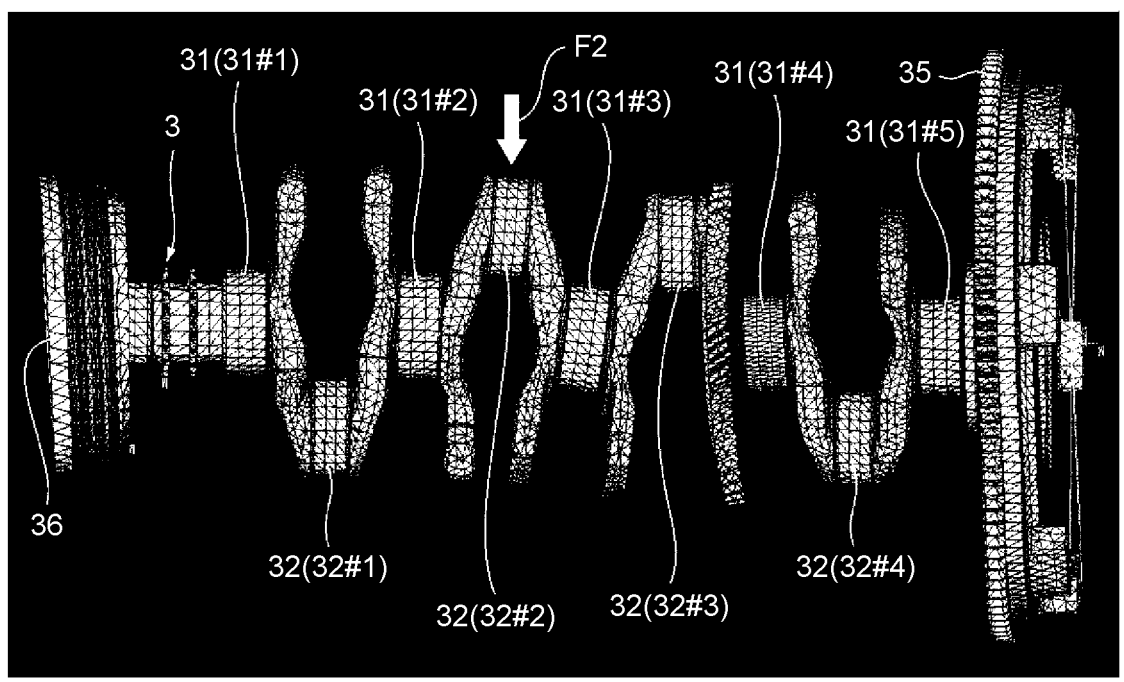
FIG. 8B is a view schematically showing the deformation mode of the crankshaft when an explosion occurs in the second cylinder.

Next, operation and effect of the cylinder block assembly 2 according to the present embodiment will be described with reference to FIG. 5A to FIG. 13. FIG. 5A to FIG. 8B are views schematically showing deformation modes of the crankshaft 3 calculated by the Nastran analysis. FIG. 5A, FIG. 5B show a deformation mode when an explosion occurs in the first cylinder 11 #1; FIG. 6A, FIG. 6B show a deformation mode when an explosion occurs in the third cylinder 11 #3; FIG. 7A, FIG. 7B show a deformation mode when an explosion occurs in the fourth cylinder 11 #4; and FIG. 8A, FIG. 8B show a deformation mode when an explosion occurs in the second cylinder 11 #2, respectively. FIG. 5A, FIG. 6A, FIG. 7A, and FIG. 8A show respective states of the crankshaft 3 when a load due to the explosion is not applied, for comparison. Further, in the present embodiment, the explosion occurs in order from the first cylinder 11 #1, the third cylinder 11 #3, the fourth cylinder 11 #4, and the second cylinder 11 #2.

As shown in FIG. 5B, when an explosion occurs in the first cylinder 11 #1, a large downward force F1 is exerted on the first crank pin 32 #1 between the first journal 31 #1 and the second journal 31 #2. Therefore, a large downward force is applied to a part of the first journal 31 #1 on the first crank pin 32 #1 side and a part of the second journal 31 #2 on the first crank pin 32 #1 side.

As shown in FIG. 5B, since the first journal 31 #1 is supported by the crank bearing 22 of the first cap 20 #1, when such a force is applied, the first journal 31 #1 tilts upward from the first crank pin 32 #1 side to the opposite side. Similarly, since the second journal 31 #2 is supported by the crank bearing 22 of the second cap 20 #2, when such a force is applied, the second journal 31 #2 tilts upward from the second crank pin 32 #2 side to the opposite side.

Here, the crankshaft 3 on the more leftward side (pulley 36 side) than the first journal 31 #1 in the drawing is not supported by the crank bearing. Therefore, the part on the more leftward side than the first journal 31 #1 is substantially an open end, and thus the first journal 31 #1 tends to tilt greatly. As a result, a load applied to the crank bearing 22 of the first cap 20 #1 from the first journal 31 #1 becomes locally larger.

On the other hand, the crankshaft 3 is supported also on the more rightward side (flywheel 35 side) than the second journal 31 #2 in the drawing by a plurality of crank bearings. Therefore, the part on the more rightward side than the second journal 31 #2 is not an open end, so that tilting of the second journal 31 #2 is not as great as that of the first journal 31 #1. Accordingly, a load from the second journal 31 #2 to the crank bearing 22 of the second cap 20 #2 is applied more evenly over the whole than a load from the first journal 31 #1 to the crank bearing 22 of the first cap 20 #1. Thus, the load does not become so great locally.

As shown in FIG. 6B, when an explosion occurs in the third cylinder 11 #3, a large downward force F3 is exerted on the third crank pin 32 #3 between the third journal 31 #3 and the fourth journal 31 #4. Therefore, a large downward force is applied to a part of the third journal 31 #3 on the third crank pin 32 #3 side and a part of the fourth journal 31 #4 on the third crank pin 32 #3 side.

As shown in FIG. 6B, since the third journal 31 #3 is supported by the crank bearing 22 of the third cap 20 #3, when such a force is applied, the third journal 31 #3 tilts upward from the third crank pin 32 #3 side to the opposite side. Similarly, since the fourth journal 31 #4 is supported by the crank bearing 22 of the fourth cap 20 #4, when such a force is applied, the fourth journal 31 #4 tilts upward from the third crank pin 32 #3 side to the opposite side.

Here, as shown in FIG. 6B, the tilting of the third journal 31 #3 is greater than the tilting of the fourth journal 31 #4. Consequently, a load on the crank bearing 22 of the third cap 20 #3 from the third journal 31 #3 is locally larger compared with a load on the crank bearing 22 of the fourth cap 20 #4 from fourth journal 31 #4.

As shown in FIG. 7B, when an explosion occurs in the fourth cylinder 11 #4, a large downward force F4 is exerted on the fourth crank pin 32 #4 between the fourth journal 31 #4 and the fifth journal 31 #5. Therefore, a large downward force is applied to a part of the fourth journal 31 #4 on the fourth crank pin 32 #4 side and a part of the fifth journal 31 #5 on the fourth crank pin 32 #4 side.

As a result, as shown in FIG. 7B, the fourth journal 31 #4 and the fifth journal 31 #5 tilt. Further, since the part located on the more rightward side (flywheel 35 side) than the fifth journal 31 #5 is substantially an open end, the tilting of the fifth journal 31 #5 becomes greater. Consequently, a load applied to the crank bearing 22 of the fifth cap 20 #5 from the fifth journal 31 #5 becomes locally larger. On the other hand, a load on the crank bearing 22 of the fourth cap 20 #4 from the fourth journal 31 #4 is evenly applied over the whole, and thus the load does not become so great locally.

Further, as shown in FIG. 8B, when an explosion occurs in the second cylinder 11 #2, a large downward force F2 is applied to the second crank pin 32 #2 between the second journal 31 #2 and the third journal 31 #3. Therefore, a large downward force is applied to a part of the second journal 31 #2 on the second crank pin 32 #2 side and a part of the third journal 31 #3 on the second crank pin 32 #2 side.

Consequently, as shown in FIG. 8B, the second journal 31 #2 and the third journal 31 #3 tilt. Here, as shown in FIG. 8B, the tilting of the third journal 31 #3 is greater than the tilting of the second journal 31 #2. As a result, a load on the crank bearing 22 of the third cap 20 #3 from the third journal 31 #3 becomes locally larger than a load on the crank bearing 22 of the second cap 20 #2 from the second journal 31 #2.

As described above, in the first journal 31 #1, the third journal 31 #3, and the fifth journal 31 #5, as explosions occur in the respective corresponding cylinders 11, a locally larger force is applied to the crank bearings 22 of the respective corresponding caps 20. In the meantime, in the second journal 31 #2 and the fourth journal 31 #4, a locally larger force is unlikely to be applied to the crank bearings 22 of the respective corresponding caps 20.

Meanwhile, thin oil films are formed between the journals 31 and the crank bearings 22 of the caps 20 while the crankshaft 3 is rotating. Accordingly, even if the crankshaft 3 rotates, a friction loss caused by a frictional resistance generated between the journals 31 and the crank bearings 22 is small.

To the contrary, when a load from the journals 31 to the crank bearings 22 becomes locally larger, the oil films formed between the journals 31 and the crank bearings 22 are partially broken. Consequently, the journals 31 and the crank bearings 22 partially come into contact with each other during the rotation of the crankshaft 3 (or the oil films between them become extremely thin), and thus this partial contact causes a large friction loss to the journals 31.

Therefore, in the first journal 31 #1, the third journal 31 #3, and the fifth journal 31 #5, the journals 31 tilt and are likely to partially come into contact with the crank bearings 22, and thus a friction loss caused by this partial contact is likely to occur. On the other hand, in the second journal 31 #2 and the fourth journal 31 #4, the tilting of the journals 31 is small, so that the journals are unlikely to come into contact with the crank bearings 22. Thus, a friction loss due to the partial contact becomes smaller.

Here, in the cylinder block assembly 2 of the present embodiment, the holes 60 are provided in each of the first cap 20 #1, the third cap 20 #3, and the fifth cap 20 #5. By providing the holes 60 in this manner, these caps can be made easily deformed. Therefore, when the crank bearing 22 of the cap 20 receives a local load from the journal 31, the cap 20 is deformed around the holes 60. Accordingly, the load applied from the journal 31 to the crank bearing 22 is dispersed across the entire crank bearing 22. When the load is dispersed in this manner, the contact of the journal 31 with the crank bearing 22 is suppressed; therefore, increase in friction loss due to the contact between them can be suppressed.

FIG. 9 to FIG. 13 show a transition of the friction loss caused between the journals 31 and the crank bearings 22 of the caps 20 while the crankshaft 3 rotates twice (one cycle). In each drawing, a solid line shows a transition in the case where the holes 60 are provided only to the first, third, and fifth caps 20 as in the present embodiment. In each drawing, a broken line indicates a transition in the case where all the caps 20 are provided with no holes 60, and an alternate long and short dashed line indicates a transition in the case where all the caps 20 are provided with the holes 60. In addition, #1, #2, #3, #4 in the each drawing indicate an explosion timing of the first cylinder 11 #1, an explosion timing of the second cylinder 11 #2, an explosion timing of the third cylinder 11 #3, and an explosion timings of the fourth cylinder 11 #4, respectively.

Figure 9:
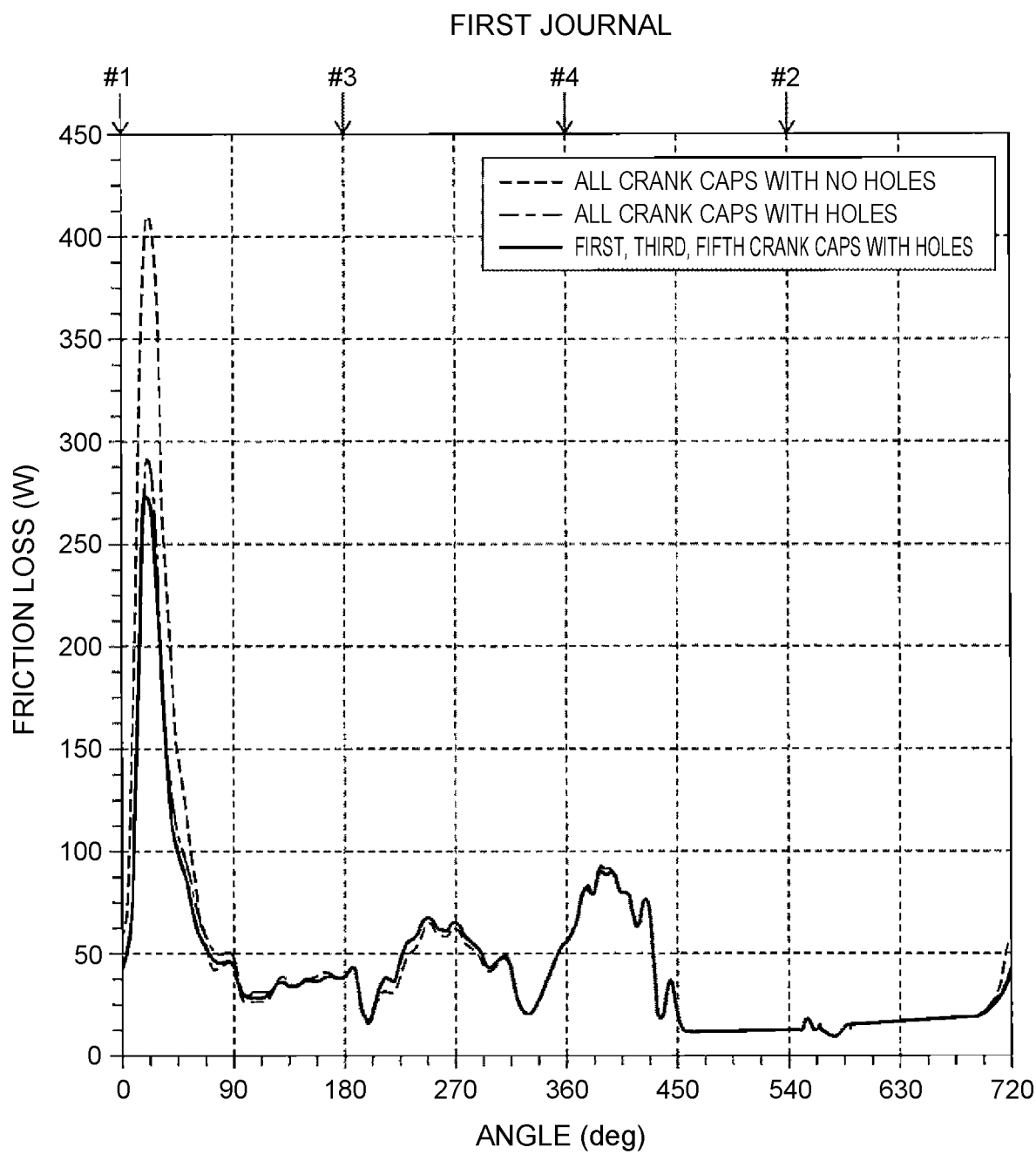
FIG. 9 is a view showing a transition of a friction loss generated between a first journal and a crank bearing of a first crank cap.

FIG. 9 shows a transition of a friction loss caused between the first journal 31 #1 and the crank bearing 22 of the first cap 20 #1. As shown in FIG. 9, in the first journal 31 #1, the largest friction loss occurs when an explosion occurs in the first cylinder 11 #1. The friction loss caused at this time becomes smaller in the case where the holes 60 are provided only to the first, third, and fifth caps 20 and the case where the holes 60 are provided in all the caps 20 than in the case where no holes 60 are provided in all the caps 20. That is, by providing the holes 60 to the first cap 20, it is possible to suppress a local contact between the first journal 31 #1 and the crank bearing 22, thereby suppressing increase in friction loss. Note that, as shown in FIG. 9, the friction loss is slightly smaller in the case where the holes 60 are provided only to the first, third, and fifth caps 20 than in the case where the holes 60 are provided in all the caps 20.

Figure 10:
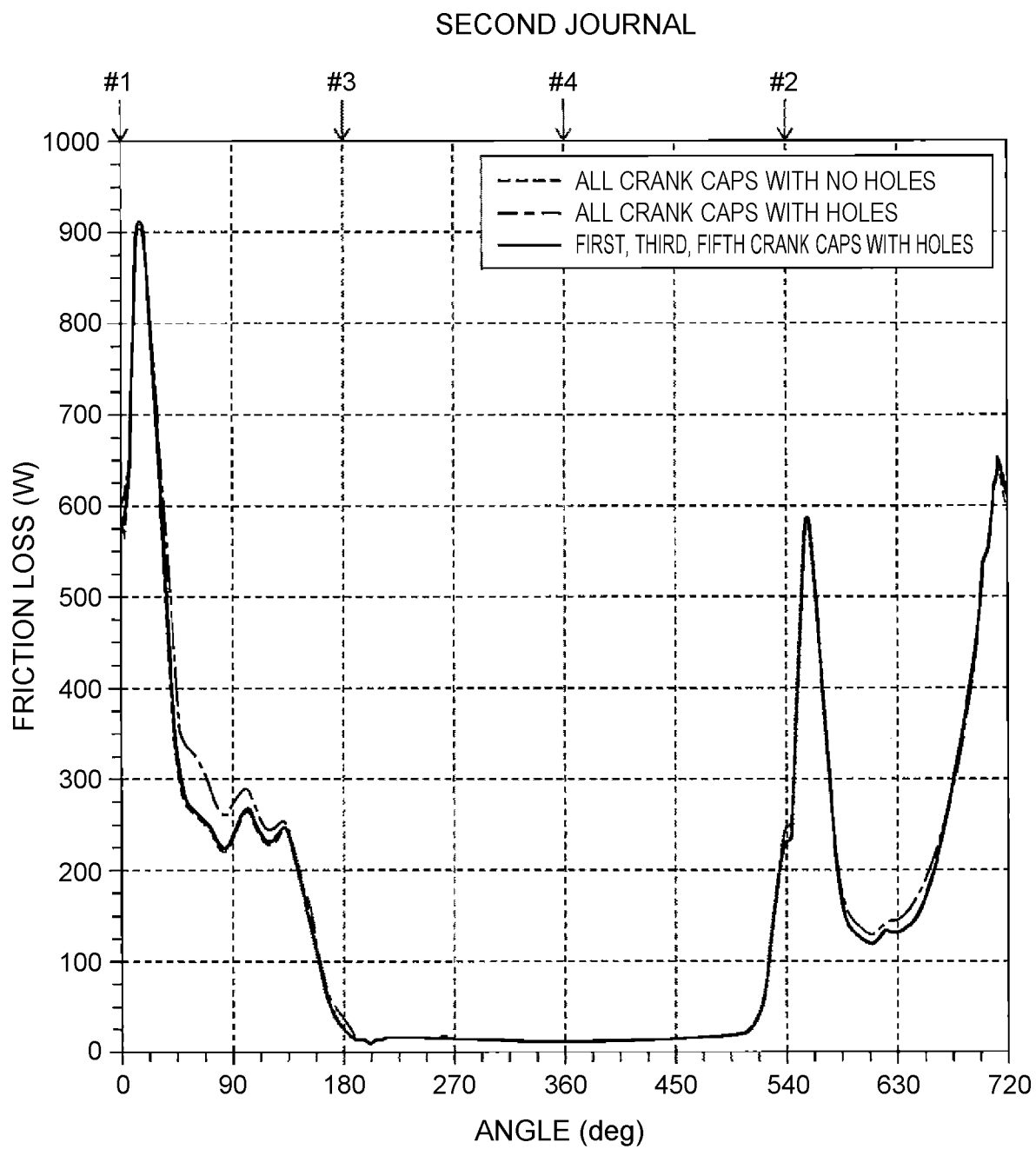
FIG. 10 is a view showing a transition of a friction loss generated between a second journal and a crank bearing of a second crank cap.

FIG. 10 shows a transition of a friction loss caused between the second journal 31 #2 and the crank bearing 22 of the second cap 20 #2. As shown in FIG. 10, a large friction loss occurs in the second journal 31 #2 when explosions occur in the first cylinder 11 #1 and the second cylinder 11 #2. However, it can be understood from FIG. 10 that a friction loss does not change in the second journal 31 #2 regardless of whether or not the holes 60 are provided in the caps 20. It is considered that this is because, in spite of providing the cap 20 with no holes 60, the second journal 31 #2 does not tilt so much even if explosions occur in the first cylinder 11 #1 and the second cylinder 11 #2, therefore, the friction loss caused by the tilting of the second journal 31 #2 is small.

Figure 11:
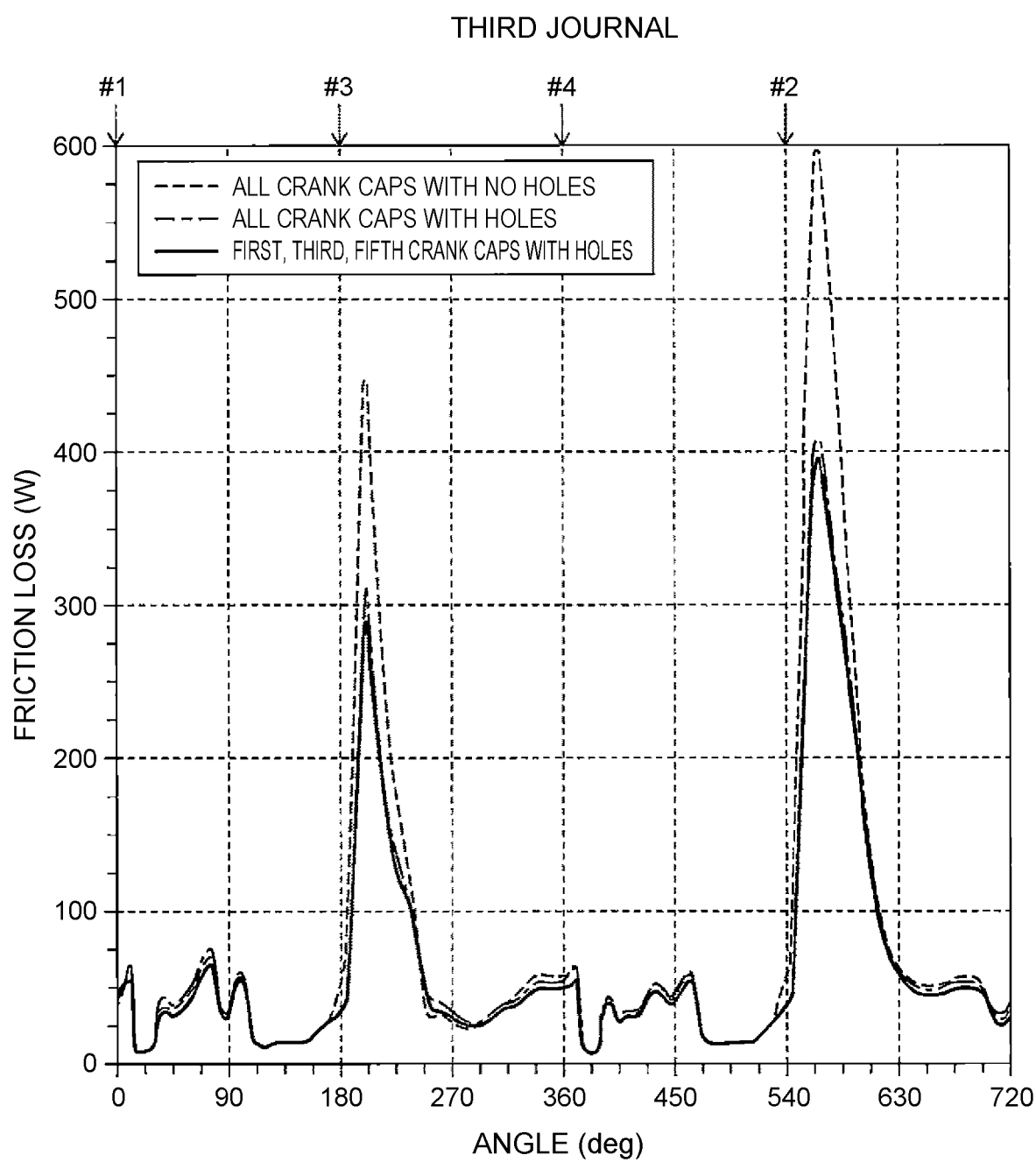
FIG. 11 is a view showing a transition of a friction loss generated between a third journal and a crank bearing of a third crank cap.

FIG. 11 shows a transition of a friction loss caused between the third journal 31 #3 and the crank bearing 22 of the third cap 20 #3. As shown in FIG. 11, the largest friction loss occurs in the third journal 31 #3 when explosions occurs in the second cylinder 11 #2 and in the third cylinder 11 #3. As with the first journal 31 #1, in the third journal 31 #3, a friction loss is smaller in the case where the holes 60 are provided in only the first, third, and fifth caps 20 and in the case where the holes 60 are provided in all the caps 20 than in the case where no holes 60 are provided in all the caps 20. In addition, a friction loss is slightly smaller in the case in which the holes 60 are provided only to the first, third, and fifth caps 20 than in the case where the holes 60 are provided in all the caps 20.

Figure 12:
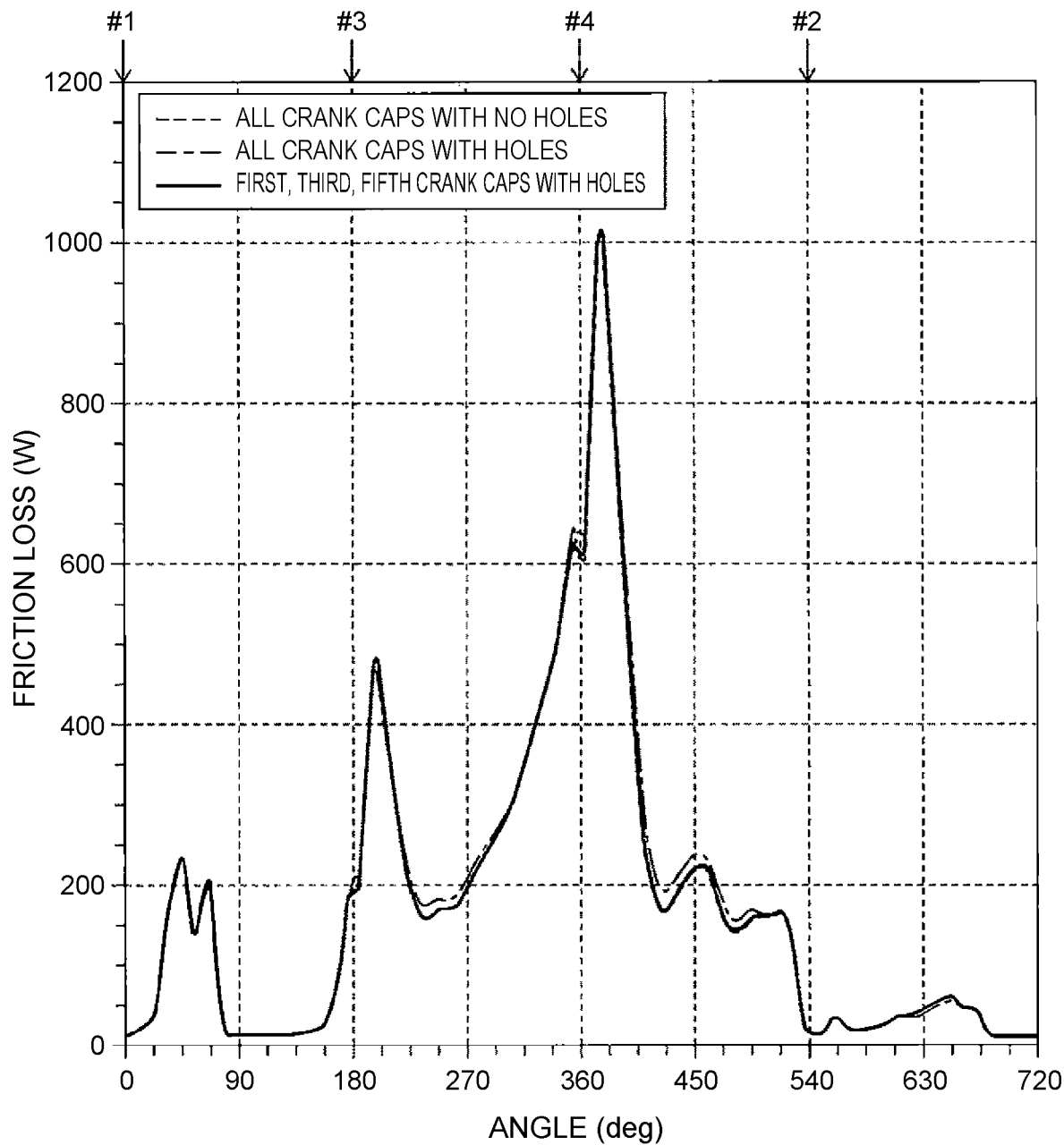
FIG. 12 is a view showing a transition of a friction loss generated between a fourth journal and a crank bearing of a fourth crank cap.

FIG. 12 shows a transition of a friction loss caused between the fourth journal 31 #4 and the crank bearing 22 of the fourth cap 20 #4. As shown in FIG. 12, a large friction loss occurs in the fourth journal 31 #4 when explosions occur in the third cylinder 11 #3 and in the fourth cylinder 11 #4. However, as shown in FIG. 12, in the fourth journal 31 #4, as with the second journal 31 #2, the friction loss does not change regardless of whether or not the holes 60 are provided in the cap 20.

FIG. 13 shows a transition of a friction loss caused between the fifth journal 31 #5 and the crank bearing 22 of the fifth cap 20 #5. As shown in FIG. 13, in the fifth journal 31 #5, the largest friction loss occurs when an explosion occurs in the fourth cylinder 11 #4. The friction loss caused at this time is smaller in the case where the holes 60 are provided only to the first, third, and fifth caps 20 and in the case where the holes 60 are provided in all the caps 20 than in the case where no holes 60 are provided in all the caps 20. In addition, the friction loss is slightly smaller in the case where the holes 60 are provided only to the first, third, and fifth caps 20 than in the case where the holes 60 are provided in all the caps 20.

As described above, by providing the holes 60 to all the caps 20 or only to the first, third, and fifth caps 20, it is possible to reduce the friction loss in the first journal 31 #1, the third journal 31 #3, and the fifth journal 31 #5, as in the present embodiment, and whereby the friction loss can be reduced across the entire crankshaft 3. In particular, in the present embodiment, in the case in which the holes 60 are provided only to the first, third, and fifth caps 20, the friction loss can be reduced so as to be slightly smaller than in the case in which the holes 60 are provided in all the caps 20.

Further, in the present embodiment, the holes 60 are provided only to the first, third, and fifth caps 20, and the holes 60 are not provided in the second and fourth caps 20. Accordingly, reduction in manufacturing cost and manufacturing time for the cylinder block assembly can be attained. The reason for this will be described below.

When the caps are manufactured, it is conceivable to manufacture the caps by cutting. In this case, caps with no holes 60 are first manufactured by cutting, and then the holes 60 are formed in some of the caps by drilling. Therefore, one more manufacturing process is required for producing the caps with the holes 60, as compared with the case of producing the caps with no holes 60.

Hence, the manufacturing cost and the manufacturing time required for producing the cap with the holes 60 are more than the manufacturing cost and the manufacturing time required for producing the cap with no holes 60. Therefore, in consideration of the manufacturing cost and the manufacturing time for all the caps, it is preferable to set the number of caps with the holes 60 to be smaller.

Here, in the present embodiment, the holes 60 are provided only to the first, third, and fifth caps 20, and no holes 60 are provided in the second and fourth caps 20. Hence, the number of caps with the holes 60 can be reduced, thereby reducing the manufacturing cost and the manufacturing time for the cylinder block assembly. As mentioned above, according to the present embodiment, the manufacturing cost and the manufacturing time for the cylinder block assembly can be reduced while the friction loss between the crack journals and the crank bearings is reduced.

Further, in the present embodiment, the plurality of holes 60 are provided in one cap 20. Therefore, beams extending substantially in the height direction are formed among the holes 60 such that each beam is positioned between the adjacent holes 60 (for example, between the first hole 61 and the second hole 62). Accordingly, while a region where the cap 20 is easily deformable is formed in a wide range in the lateral direction of the cap 20, a portion around the holes 60 of the cap 20 is suppressed from being deformed more than necessary.

Next, modifications of the above embodiment will be described with reference to FIG. 14A to FIG. 20. In the following modifications, the configuration of the cap 20, particularly the configuration of the holes provided in the cap 20, is different from that of the above embodiment.

Figure 14A:
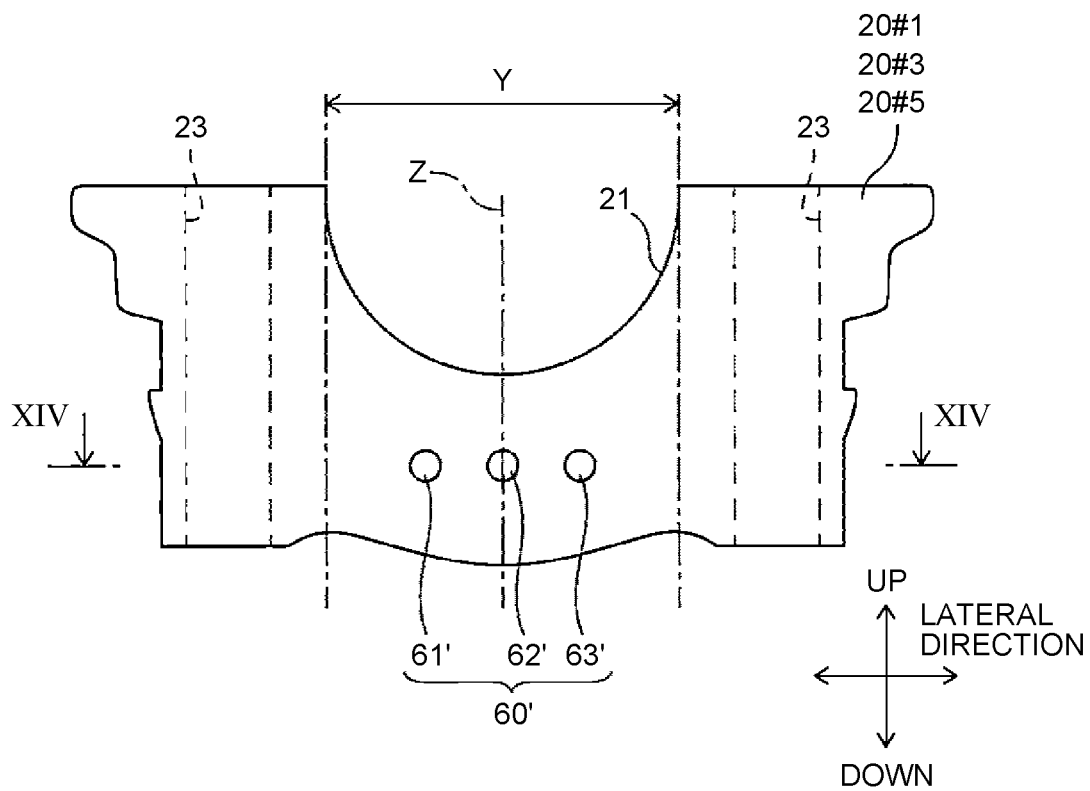
FIG. 14A is a view showing a configuration of a center crank cap and a side crank cap according to a first modification.
Figure 14B:
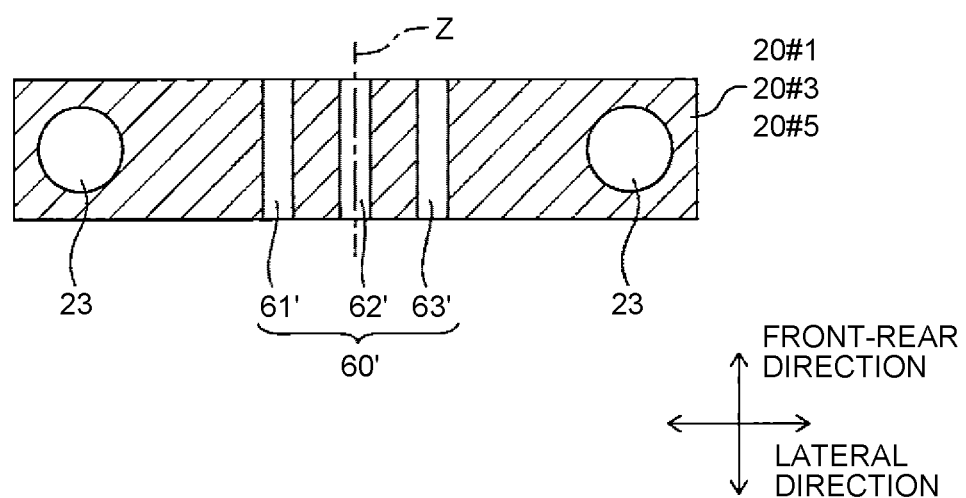
FIG. 14B is a view showing the configurations of the center crank cap and the side crank cap according to the first modification.

FIG. 14A, FIG. 14B are drawings showing a structure of a center cap and a side cap according to the first modification. FIG. 14A is a side view of the center cap and the side cap, and FIG. 14B is a sectional plan view taken along line XIV-XIV of FIG. 14A.

As shown in FIG. 14A, FIG. 14B, in the first modification, each of the center cap (20 #3) and the side caps (20 #1, 20 #5) are provided with three holes 60' of a first hole 61', a second hole 62', and a third hole 63', as with the above embodiment. The three holes 61', 62', 63' has the same circular cross-sectional shape in a cross section perpendicular to the front-rear direction. Therefore, the three holes 61', 62', 63' provided in each of the center cap (20 #3) and the side caps (20 #1, 20 #5) have the same shape.

According to the first modification, since the three holes 60' have the same circular cross-sectional shape, all the holes 60' can be formed using a single drill when the holes 60' are formed in each cap. Therefore, according to the first modification, it is possible to facilitate the manufacturing of the caps 20.

Figure 15A:
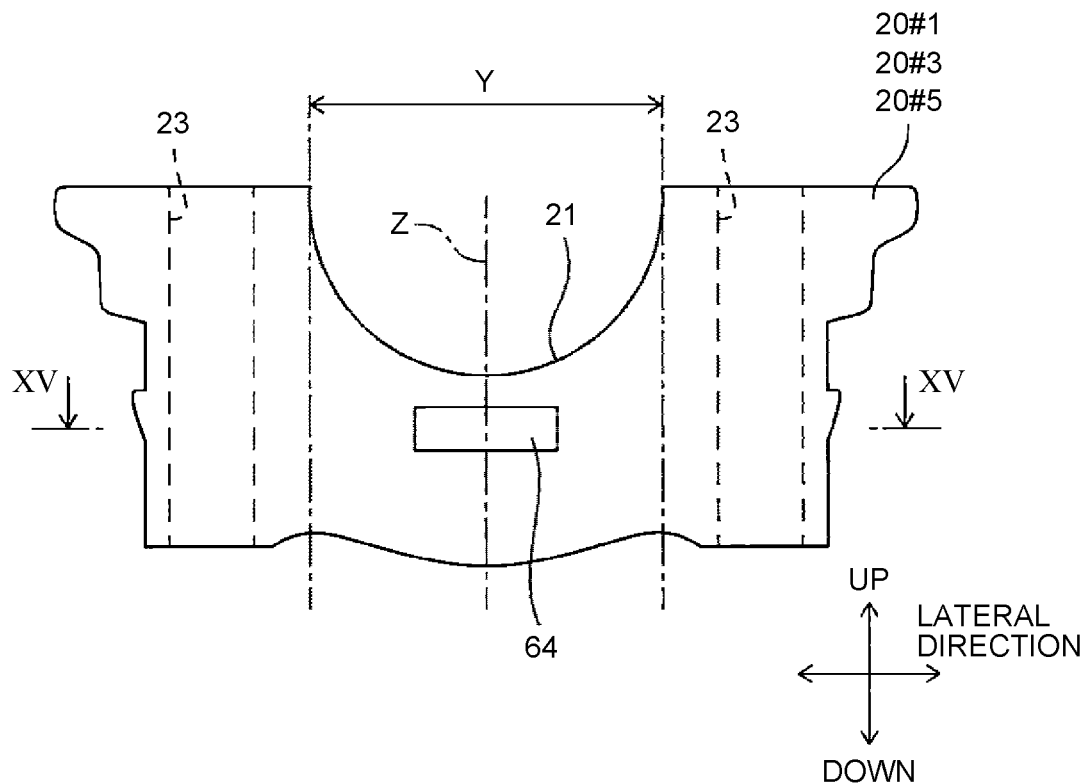
FIG. 15A is a view showing a configuration of a center crank cap and a side crank cap according to a second modification.
Figure 15B:
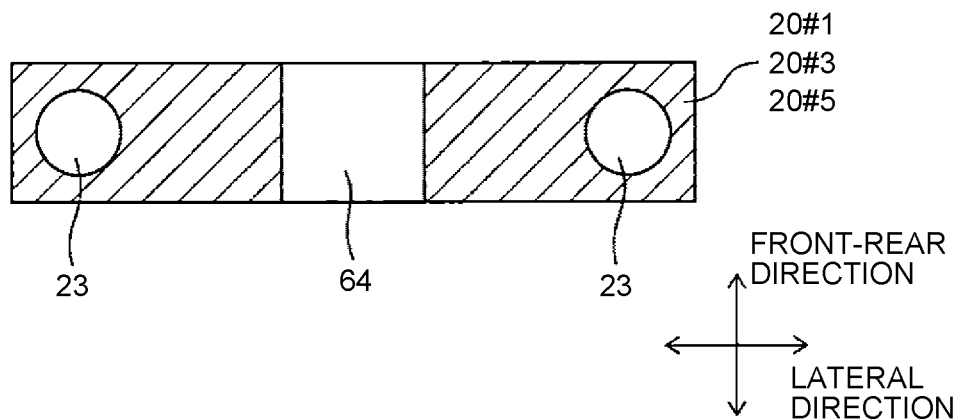
FIG. 15B is a view showing the configuration of the center crank cap and the side crank cap according to the second modification.

FIG. 15A, FIG. 15B are views showing configurations of a center cap (20 #3) and side caps (20 #1, 20 #5) according to a second modification. FIG. 15A is a side view of the center cap and the side cap, and FIG. 15B is a sectional plan view taken along line XV-XV of FIG. 15A.

As shown in FIG. 15A, FIG. 15B, in the second modification, each of the center cap (20 #3) and the side caps (20 #1, 20 #5) has one hole 64. The hole 64 extends in the front-rear direction so as to extend through the center cap or the side cap.

In a cross section perpendicular to the front-rear direction, the hole 64 in the second modification has a substantially rectangular cross-sectional shape in which a long side extends in the lateral direction and a short side extends in the height direction. The hole 64 in the second modification is arranged inward of the both lateral ends of the recess 21 when viewed in the height direction (that is, arranged in the region Y in FIG. 15A). In particular, the hole 64 in the second modification is provided so as to be symmetrical with respect to the central plane Z in the lateral direction of the cap 20.

As shown in the first and second modifications, each of the center cap (20 #3) and the side caps (20 #1, 20 #5) may have only one hole, or may have three holes. Alternatively, each of the center cap and the side caps may have a plurality of (two, four, five, etc.) holes other than three holes.

However, regardless of the number of holes provided in each cap 20, the holes may be provided so as to extend in the front-rear direction, or may be provided so as to extend through the cap 20. By providing the holes in this manner, the drilling process can be facilitated. Further, when each of the caps 20 is provided with a plurality of holes, the holes may be arranged side by side in the front-rear direction.

In the cross section perpendicular to the front-rear direction, the hole may have a cross-sectional shape other than a circular, an oval, an ellipse, or a rectangular shape. Furthermore, when the cap 20 is provided with a plurality of holes, the cross-sectional shapes of the holes in the cross section perpendicular to the front-rear direction may be the same.

In any case, easiness of deformation of the cap 20 changes in accordance with the number, shape, and positions of the holes provided in the cap 20. Therefore, the number, the shape and the positions of the holes provided in the cap 20 are designed based on the degree of tilting of the corresponding journal 31 due to deformation or the like when an explosion load is applied to the crankshaft 3. Therefore, when the explosion load is applied to the crankshaft 3, and if the degree of tilting of the corresponding journal 31 due to the deformation differs from one another, the number, shape and positions of the holes provided in the cap 20 may be designed to be different from one another.

Figure 16A:
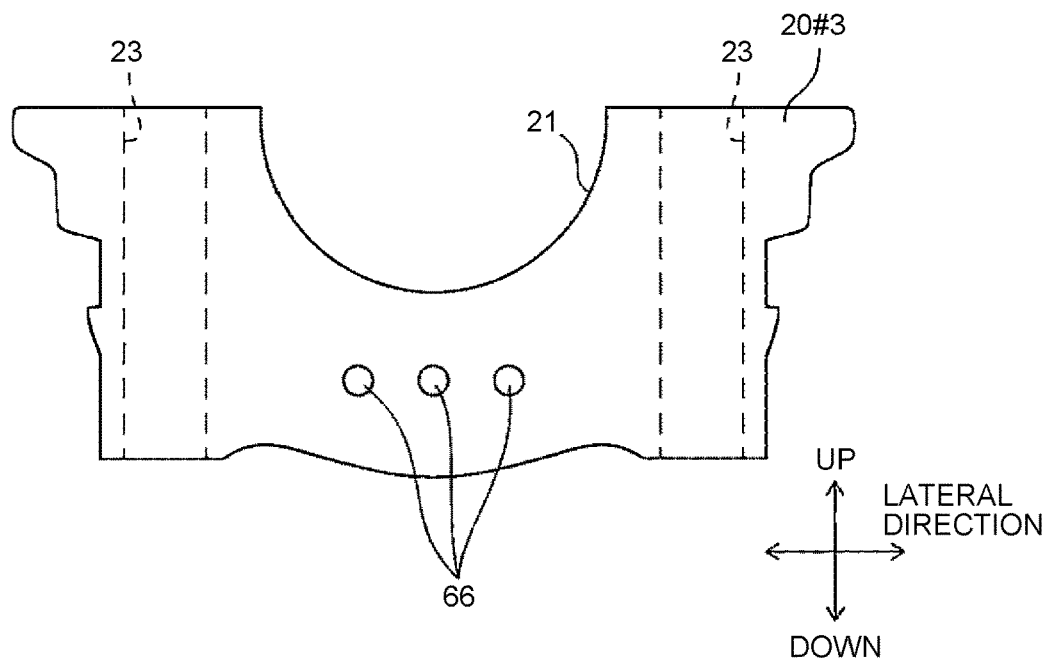
FIG. 16A is a view showing a configuration of a center crank cap according to a third modification.
Figure 16B:
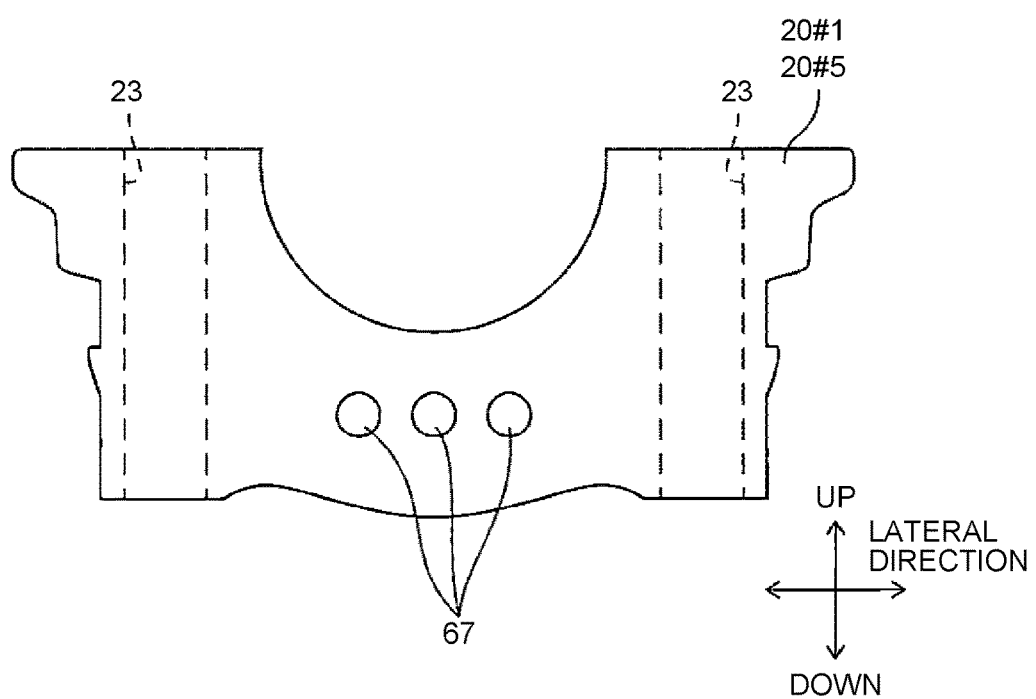
FIG. 16B is a view showing a configuration of the side crank cap according to the third modification.

FIG. 16A, FIG. 16B are views showing configurations of a center cap and a side cap according to a third modification. FIG. 16A is a side view of the center cap (20 #3) and FIG. 16B is a side view of each of the side caps (20 #1, 20 #5).

As shown in FIG. 16A, FIG. 16B, in the third modification, the center cap (20 #3) and the side caps (20 #1, 20 #5) are configured such that each of the holes 66 provided in the side cap is larger than a corresponding one of the holes 67 provided in the center cap, in a cross section perpendicular to the front-rear direction. Accordingly, the side cap is more easily deformable than the center cap when a load is received from the crankshaft 3.

As described above, since the first journal 31 #1 and the fifth journal 31 #5 supported by the side caps (20 #1, 20 #5) are disposed near the open ends of the crankshaft 3, the tilting of them often becomes especially larger when the crankshaft 3 receives a load. According to the third modification, the side caps (20 #1, 20 #5) respectively supporting the first journal 31 #1 and the fifth journal 31 #5 which particularly greatly tilt are so formed as to be easily deformable. Accordingly, it is possible to reduce a local load between the first and fifth journals 31 #1, 31 #5 and the crank bearings 22 of the side caps, thereby properly reducing the friction loss.

Figure 17A:
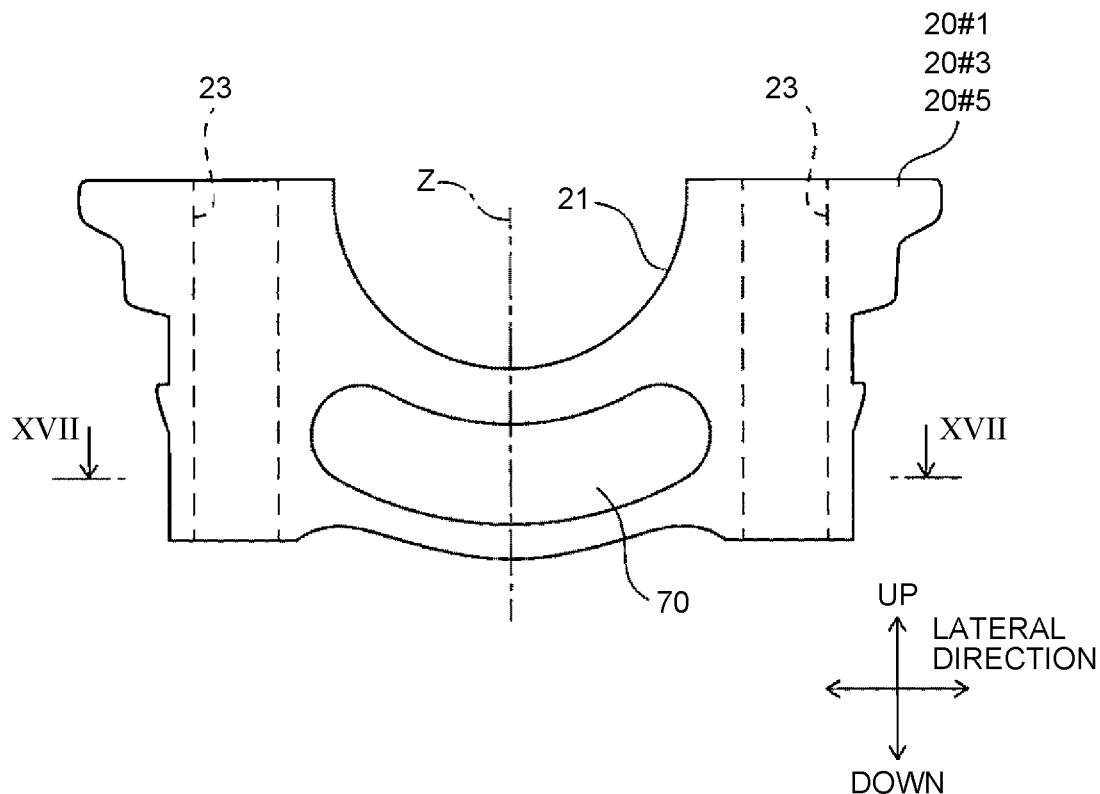
FIG. 17A is a view showing a configuration of a center crank cap, a side crank cap, and an intermediate crank cap according to a fourth modification.
Figure 17B:
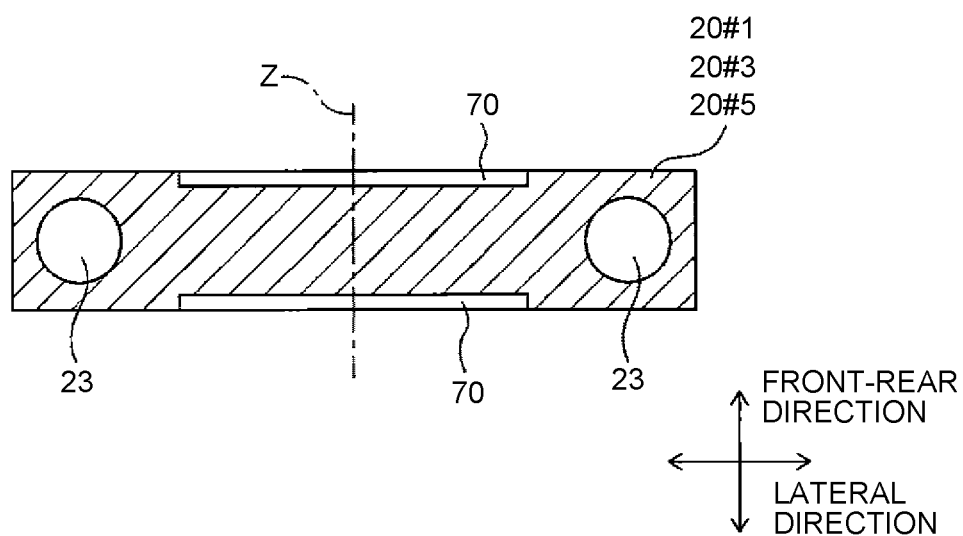
FIG. 17B is a view showing the configuration of the center crank cap, the side crank cap, and the intermediate crank cap according to the fourth modification.

FIG. 17A, FIG. 17B are views showing configurations of the center cap (20 #3) and the side caps (20 #1, 20 #5) according to a fourth modification. FIG. 17A is a side view of the center cap and each side cap, and FIG. 17B is a sectional plan view taken along line XVII-XVII of FIG. 17A.

As shown in FIG. 17A, FIG. 17B, in the fourth modification, each of the center cap (20 #3) and the side caps (20 #1, 20 #5) is provided with grooves 70. The grooves 70 are provided respectively on both side surfaces of each cap 20 located in the front-rear direction. Each groove 70 is so provided as to extend in the lateral direction. In particular, in the present embodiment, each groove 70 is formed at a position away from the recess 21 and formed to be curved and extend along the outer periphery of the recess 21. Further, in the present embodiment, the grooves 70 are provided so as to have the same depth throughout the grooves.

Furthermore, in the present embodiment, the two grooves 70 provided in the both side surfaces of each of the center cap (20 #3) and the side caps (20 #1, 20 #5) are provided in planes perpendicular to the front-rear direction so as to be symmetrical to each other. In addition, the respective grooves 70 are provided to be symmetrical with respect to the central plane Z in the lateral direction of the cap 20.

In addition, at least a part (preferably whole) of each groove 70 is disposed inward of the both lateral ends of the recess 21 when viewed in the height direction (that is, disposed in the region Y in FIG. 3A). In other words, at least a part (preferably whole) of each groove 70 is disposed so as to overlap the recess 21 (i.e., the crank bearing 22) of the crank cap when viewed in the height direction.

In the fourth modification, the grooves 70 extend at the same depth with a certain length in the lateral direction. Therefore, the cap 20 of the present modification is easily deformed evenly over the range in which the grooves 70 extend.

Further, in the fourth modification, each groove 70 is disposed apart from the recess 21. Therefore, even if each groove 70 is provided, a surface area where the recess 21 is provided does not decrease. When the surface area where the recess 21 is provided becomes smaller, a surface area for supporting the crankshaft 3 decreases, and a stress applied to the surface of the recess 21 thus becomes larger. However, according to the present modification, such increase in stress is suppressed.

In addition, in the fourth modification, the two grooves 70 are provided to be symmetrical to each other. In addition, the grooves 70 are provided to be symmetrical to each other with respect to the plane Z. Hence, deformability of the cap 20 is configured to be symmetrical in the front-rear direction and the lateral direction. Accordingly, the stress applied to the cap 20 is prevented from being biased.

In the fourth modification, the depth of each groove 70 is constant throughout the groove. However, the depth of each groove 70 may be different in each region. Thereby, the deformability of the cap 20 can be adjusted for each area. Further, in the fourth modification, only one groove 70 is provided in each side surface of the cap 20. However, a plurality of grooves may be provided in each side surface of the cap 20.

Figure 18A:
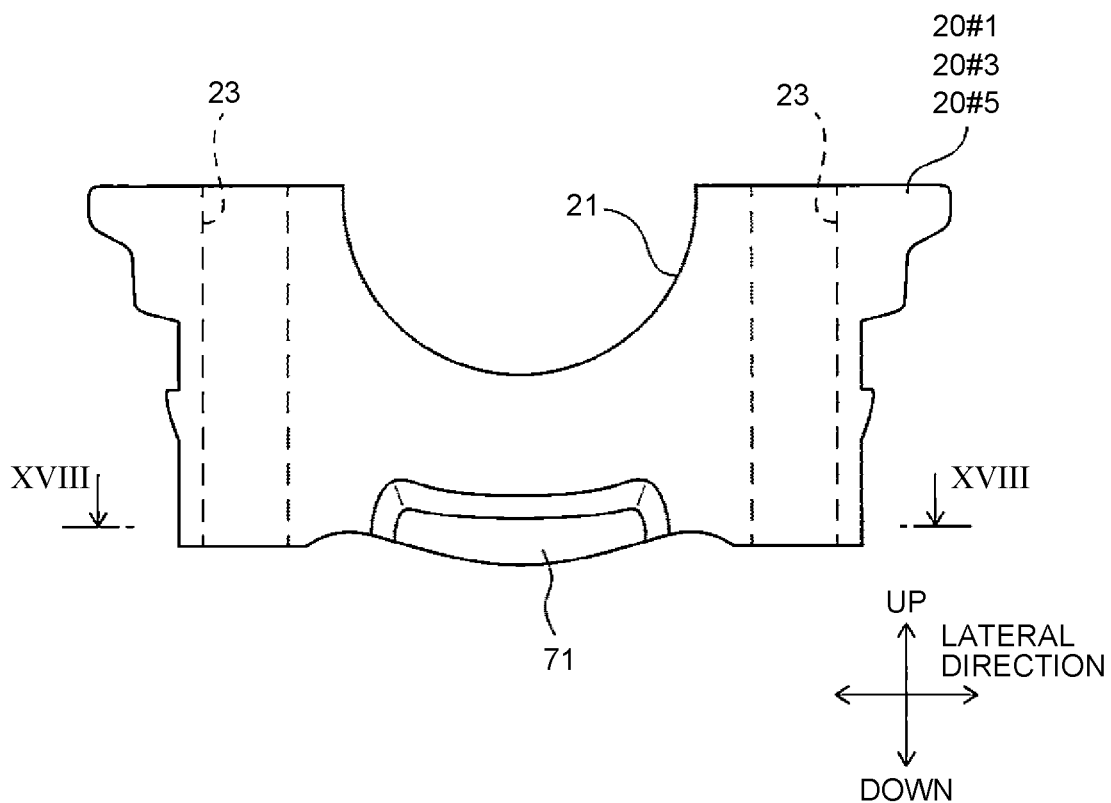
FIG. 18A is a view showing a configuration of a center crank cap, a side crank cap, and an intermediate crank cap according to a fifth modification.
Figure 18B:
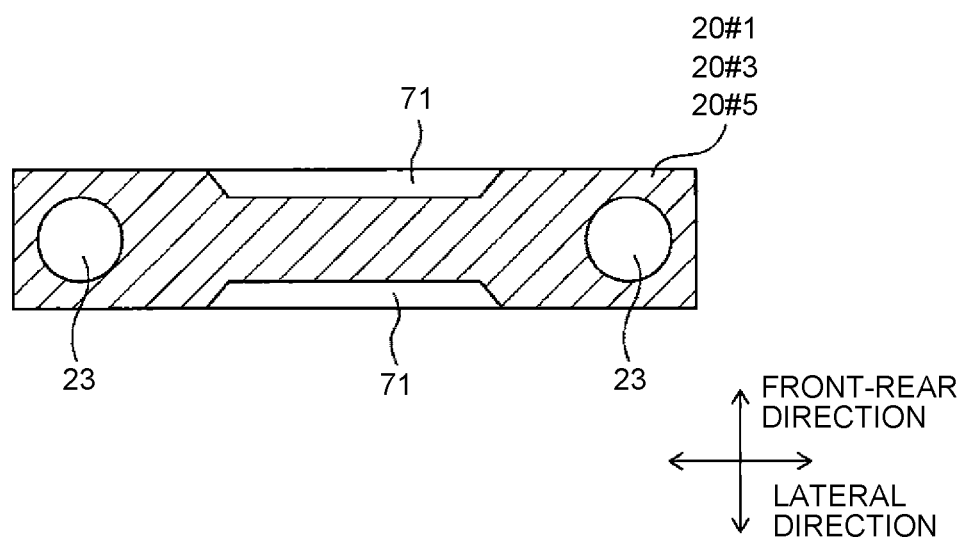
FIG. 18B is a view showing the configuration of the center crank cap, the side crank cap, and the intermediate crank cap according to the fifth modification.

FIG. 18A, FIG. 18B are views showing a configuration of the center cap (20 #3) and the side caps (20 #1, 20 #5) according to a fifth modification. FIG. 18A is a side view of the center cap and each side cap, and FIG. 18B is a sectional plan view taken along line XVIII-XVIII of FIG. 18A.

As shown in FIG. 18A, FIG. 18B, in the fifth modification, the center cap (20 #3) and the side caps (20 #1, 20 #5) are provided with the grooves 71 as with the fourth modification. However, in the fifth modification, the grooves 71 extend so as to be continued to a lower surface of the cap 20, which is different from the grooves 70 of the fourth modification. In the other respects, the grooves 71 of the fifth modification have the same configuration as that of the grooves 70 of the fourth modification.

Figure 19:
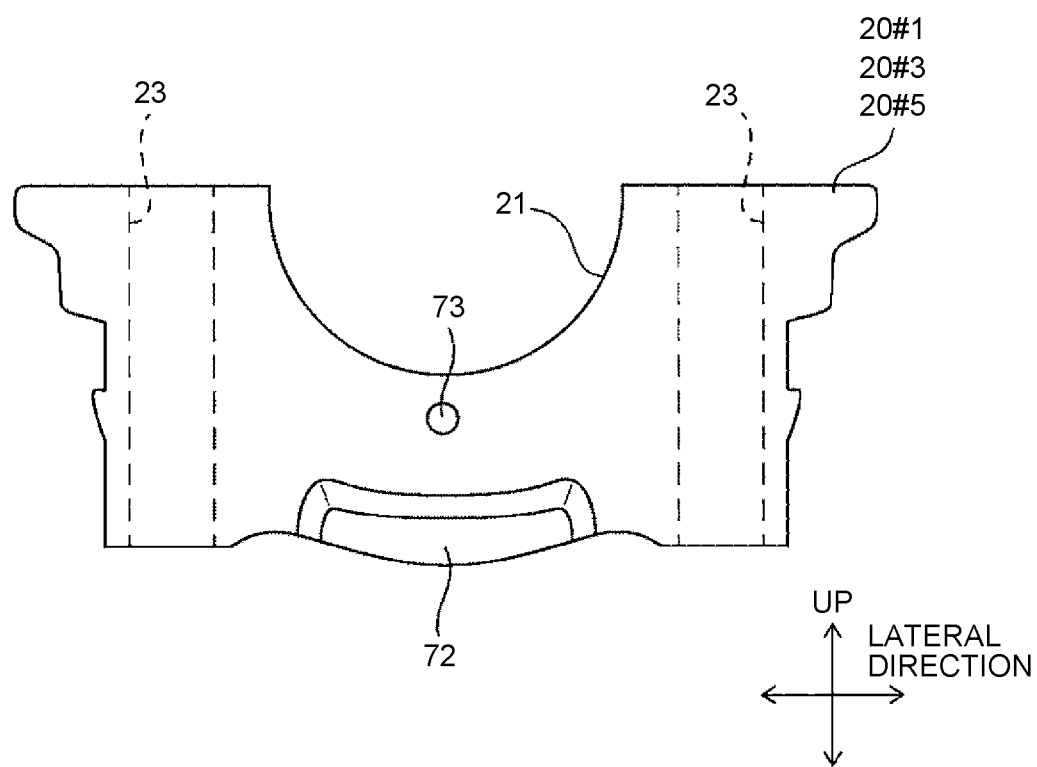
FIG. 19 is a view showing a configuration of a center crank cap, a side crank cap, and an intermediate crank cap according to a sixth modification.

FIG. 19 is a view showing a configuration of the center cap (20 #3) and the side caps (20 #1, 20 #5) according to a sixth modification. FIG. 19 is a side view of the center cap and the side cap.

As can be understood from FIG. 19, in the sixth modification, the center cap (20 #3) and the side caps (20 #1, 20 #5) are provided with grooves 72 and one hole 73 having a circular cross section. The grooves 72 are provided in the same manner as that in the grooves 71 of the fifth modification. The hole 73 is provided between the grooves 72 and the recess 21.

In the sixth modification, one groove 70 is provided in each side surface of the cap 20, but a plurality of grooves may be provided in each side surface. Moreover, the cap 20 of the sixth modification is provided with only one hole 73 having a circular cross section, but the cap 20 may be provided with a plurality of holes having any cross-sectional shape. In addition, each cap 20 of the sixth modification is provided with the hole 73 between the grooves 72 and the recess 21, but the grooves 72 and the hole 73 may be arranged in any positional relationship.

Summarizing the above embodiment and modifications, it can be said that each of the center cap (20 #3) and the side caps (20 #1, 20 #5) is configured to have a shape including a removed portion (i.e., a hole or a groove) which is partially removed, as compared with the shape of each intermediate cap, in such a manner that the center cap and the side caps are more easily deformable than the intermediate caps when a load is received from the crankshaft.

In particular, in the above-described embodiment and modifications, the removed portion is arranged apart from the recess 21. Therefore, by providing the removed portion, the surface area where the recess 21 is provided is suppressed from decreasing, to thereby suppress increase in stress applied to the surface in which the recess 21 is provided.

Further, in the above-described embodiment and modifications, the cylinder block assembly used in an in-line four-cylinder internal combustion engine is targeted. However, if an internal combustion engine has an even number of four or more cylinders, such as an in-line six-cylinder internal combustion engine, the cylinder block assembly having the aforementioned configuration may be used. For example, in a six-cylinder internal combustion engine with seven caps from the first cap to the seventh cap aligned in line, the fourth cap corresponds to the center cap, and the first cap and the seventh cap correspond to the side caps. The rest of the caps (the second cap, the third cap, the fifth cap, the sixth cap) correspond to the intermediate caps.

Figure 20:
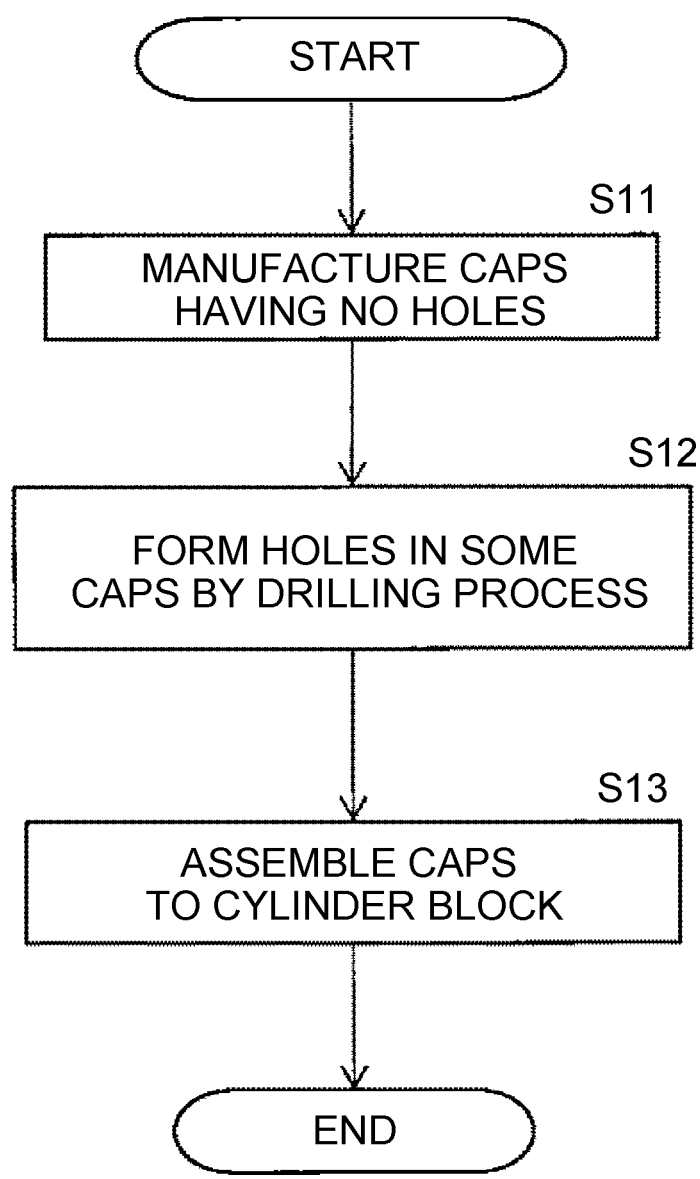
FIG. 20 is a flowchart showing a manufacturing procedure of the cylinder block assembly provided with the caps shown in FIG. 3A, FIG. 3B, FIG. 4A, FIG. 4B.

Next, with reference to FIG. 20, a manufacturing method for the cylinder block assembly will be described. FIG. 20 is a flowchart showing a manufacturing procedure of the cylinder block assembly provided with the caps 20 shown in FIG. 3A, FIG. 3B, FIG. 4A, FIG. 4B First, in step S11, caps having no holes 60 (or no grooves 70) are produced. Specifically, for example, by cutting an outer periphery of a rectangular parallelepiped blank, caps provided with no holes 60 (hereinafter, such caps are also referred to as "unprocessed caps") are produced.

Next, in step S12, a drilling process is performed on some of the unprocessed caps produced in step S11, whereby the unprocessed caps are formed with the holes 60 penetrating the unprocessed caps. Accordingly, the caps after being subjected to the drilling process (hereinafter also referred to as "processed caps") become easily deformable than the unprocessed caps when the caps receive a load from the crankshaft 3 after being assembled to the cylinder block 10.

In the case where the grooves 70 as shown in FIG. 17A, FIG. 17B are provided instead of the holes 60, the cutting process is performed in step S12, whereby the side surfaces (particularly, the side surfaces located in the front-rear direction at the time of being assembled to the cylinder block 10) of the unprocessed cap are formed with grooves. Therefore, summarizing the above configurations, in step S12, some of the unprocessed caps are subjected to a removal process of removing parts of the unprocessed caps so as to be easily deformable when a load is received from the crankshaft 3.

Next, in step S13, the unprocessed caps and the processed caps are assembled to the cylinder block. Specifically, the processed caps after being subjected to the removal process are assembled to the center journal (31 #3) and the side journals (31 #1, 31 #5) among the plurality of journals 31 of the crankshaft 3. In addition, the unprocessed caps not being subjected to the removal process are assemble to the intermediate journals (31 #2, 31 #4) among the plurality of crank journals 31.

Although the preferred embodiments according to the present disclosure have been described above, the present disclosure is not limited to these embodiments, and various modifications and changes can be made within the scope of the claims.

What is claimed is:

1. A cylinder block assembly comprising:
a cylinder block having an even number of four or more cylinders that are arranged in line; and
a plurality of crank caps fixed to the cylinder block and aligned in line in an alignment direction of the cylinders;
wherein
the plurality of crank caps and the cylinder block are provided with crank bearings;
the crank bearings support a crankshaft such that the crankshaft is rotatable;
the crank caps are arranged such that one of the crank caps is disposed on each of both sides of each of the cylinders in the alignment direction;
among the plurality of crank caps arranged in line, only each of a center crank cap located at a center position and two side crank caps respectively located at both ends has a hole or a groove in such a manner as to be more easily deformable than intermediate crank caps each of which is located between the center crank cap and one of the side crank caps when a load is received from the crankshaft, the intermediate crank caps being free of a hole or a groove; and
wherein each of the plurality of crank caps includes a semicircular recess on a top thereof, and the hole or the groove in only each of the center crank cap located at the center position and the two side crank caps respectively located at both ends is disposed below the semicircular recess.

2. The cylinder block assembly according to claim 1, wherein each of the center crank cap and the side crank caps has the hole, and the hole extends through the crank cap.

3. The cylinder block assembly according to claim 2, wherein a plurality of the holes is provided in each of the center crank cap and the side crank caps.

4. The cylinder block assembly according to claim 3, wherein the plurality of the holes provided in each of the center crank cap and the side crank caps is arranged in a direction perpendicular to the alignment direction of the cylinders and a mounting direction in which the crank caps are mounted to the cylinder block.

5. The cylinder block assembly according to claim 3, wherein the plurality of the holes provided in each of the center crank cap and the side crank caps has the same shape.

6. The cylinder block assembly according to claim 2, wherein the holes are provided so as to extend in the alignment direction of the cylinders.

7. The cylinder block assembly according to claim 1, wherein each of the center crank cap and the side crank caps has the groove, and the groove is provided on a side surface of each of the center crank cap and the side crank caps, the side surface being located in the alignment direction of the cylinders.

8. The cylinder block assembly according to claim 7, wherein the grooves are respectively provided on both side surfaces of each of the center crank cap and the side crank caps to have a symmetrical shape, the side surfaces being located in the alignment direction of the cylinders.

9. The cylinder block assembly according to claim 1, wherein at least a part of the hole or the groove is disposed so as to overlap a corresponding one of the crank bearings when viewed in the mounting direction in which the crank caps are mounted to the cylinder block.

10. The cylinder block assembly according to claim 1, wherein the hole or the groove of the center crank cap and the hole or the groove of each of the side crank caps are provided such that the side crank caps are more easily deformable than the center crank cap is when a load is received from the crankshaft.

11. The cylinder block assembly according to claim 1, wherein the center crank cap and the two side crank caps have the same shape.

12. The cylinder block assembly according to claim 1, wherein the intermediate crank caps have the same shape.

13. A manufacturing method for a cylinder block assembly that includes a cylinder block having an even number of four or more cylinders arranged in line, and a plurality of crank caps fixed to the cylinder block and arranged in line in an alignment direction of the cylinders so as to support a crankshaft, such that the crankshaft is rotatable, the manufacturing method comprising:
manufacturing a plurality of crank caps having the same shape;
performing a removal process on some crank caps of the manufactured crank caps to remove a part of each of the crank caps such that the crank caps become easily deformable when a load is received from the crankshaft;
assembling the crank caps that have been subjected to the removal process to only a center crank journal located at a center position and two side crank journals located at both ends among a plurality of crank journals of the crankshaft; and
assembling the crank caps that have not been subjected to the removal process to intermediate crank journals each of which is located between the center crank journal and one of the side crank journals among the plurality of crank journals,
wherein each of the plurality of crank caps includes a semicircular recess on a top thereof, and the hole or the groove in only each of the center crank cap located at the center position and the two side crank caps respectively located at both ends is disposed below the semicircular recess.

14. The manufacturing method for a cylinder block assembly according to claim 13, wherein
the removal process includes a process of forming holes extending through the crank caps or a process of forming grooves on side surfaces of the crank caps, the side surfaces being located in the alignment direction of the cylinders.

* * * * *